US008852743B2

(12) United States Patent
Kikuchi et al.

(10) Patent No.: US 8,852,743 B2
(45) Date of Patent: Oct. 7, 2014

(54) ELECTRO-CONDUCTIVE MEMBER FOR ELECTROPHOTOGRAPHY, PROCESS CARTRIDGE, AND ELECTROPHOTOGRAPHIC APPARATUS

(71) Applicant: Canon Kabushiki Kaisha, Tokyo (JP)

(72) Inventors: Yuichi Kikuchi, Susono (JP); Kazuhiro Yamauchi, Suntou-gun (JP); Satoru Nishioka, Suntou-gun (JP); Norifumi Muranaka, Yokohama (JP); Satoru Yamada, Numazu (JP); Masahiro Watanabe, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/875,202

(22) Filed: May 1, 2013

(65) Prior Publication Data

US 2013/0315620 A1 Nov. 28, 2013

Related U.S. Application Data

(63) Continuation of application No. PCT/JP2012/008243, filed on Dec. 25, 2012.

(30) Foreign Application Priority Data

Dec. 26, 2011 (JP) ................................ 2011-284453

(51) Int. Cl.
*B32B 27/18* (2006.01)
*B32B 27/34* (2006.01)
*G03G 15/02* (2006.01)

(52) U.S. Cl.
USPC ..... 428/413; 428/423.1; 428/447; 428/474.4; 428/480; 399/168

(58) Field of Classification Search
USPC .................. 428/413, 423.1, 447, 474.4, 480; 399/168
See application file for complete search history.

(56) References Cited

U.S. PATENT DOCUMENTS 6,127,622 A 10/2000 Yamada et al.
7,378,139 B2 * 5/2008 Barrese et al. ............ 428/36.91

(Continued)

FOREIGN PATENT DOCUMENTS

JP 2003-221474 A 8/2003
JP 2004-184512 A 7/2004

(Continued)

OTHER PUBLICATIONS

PCT International Search Report and Written Opinion of the International Searching Authority, International Application No. JP2012/008243, Mailing Date Mar. 5, 2013.

(Continued)

*Primary Examiner* — Peter D. Mulcahy
*Assistant Examiner* — Henry Hu
(74) *Attorney, Agent, or Firm* — Fitzpatrick, Cella, Harper and Scinto

(57) ABSTRACT

An electro-conductive member for electrophotography, including an electro-conductive mandrel and an electro-conductive layer; and a process cartridge and an electrophotographic apparatus using the same. The layer contains a binder resin having a sulfo or a quaternary ammonium group as an ion exchange group, and an ion opposite in polarity to the ion exchange group. The resin has any one of structures represented by formulas (1)-1 and (1)-2, and any one of structures represented by formulas (2)-1 to (2)-3; and the resin has a molecular structure preventing occurrence of a matrix-domain structure. M represents an integer of 2-20, n represents an integer of 5-50, p represents an integer of 1-25, q represents an integer of 1-15, and r represents an integer of 1-12.

$-(CF_2)_m-$ Formula (1)-1

$-(CF_2-CF_2-O)_n-$ Formula (1)-2

$-(CH_2-CH_2-O)_p-$ Formula (2)-1

$-(CH_2-CHCH_3-O)_q-$ Formula (2)-2

$-(CH_2-CH_2-CH_2-CH_2-O)_r-$ Formula (2)-3

10 Claims, 2 Drawing Sheets

(56) References Cited

U.S. PATENT DOCUMENTS 7,629,426 B2 * 12/2009 Goldbach ..................... 526/274
7,727,134 B2 6/2010 Nakamura et al.
7,947,339 B2 5/2011 Yamauchi et al.
8,176,632 B2 5/2012 Kawamura et al.
8,222,306 B2 * 7/2012 Schlenoff ........................ 521/27
8,298,670 B2 * 10/2012 Muranaka et al. ......... 428/411.1
8,449,975 B2 * 5/2013 Hirakoso et al. .............. 428/323
8,715,830 B2 * 5/2014 Yamada et al. ............... 428/413
2011/0182618 A1 7/2011 Kuruma et al.
2012/0020700 A1 * 1/2012 Yamada et al. ............... 399/111
2012/0195631 A1 * 8/2012 Yamada et al. ............... 399/111
2012/0195649 A1 8/2012 Kawamura et al.
2012/0251171 A1 * 10/2012 Muranaka et al. ............ 399/111
2012/0263499 A1 10/2012 Yamauchi et al.
2012/0281998 A1 * 11/2012 Kikuchi et al. ............... 399/111
2012/0308261 A1 12/2012 Tsuru et al.
2013/0236213 A1 * 9/2013 Yamauchi et al. ............ 399/159
2013/0279936 A1 10/2013 Yamada et al.
2013/0281275 A1 10/2013 Nishioka et al.
2013/0281276 A1 10/2013 Watanabe et al.

FOREIGN PATENT DOCUMENTS

JP 2006-249140 A * 9/2006
JP 2007-127777 A 5/2007
JP 2007-147733 A 6/2007
JP 2009-58635 A 3/2009
JP 2011-112920 A 6/2011
JP 2011-145659 A 7/2011

OTHER PUBLICATIONS

International Preliminary Report on Patentability, International Application No. PCT/JP2012/008243, Mailing Date Jul. 10, 2014.

* cited by examiner

ELECTRO-CONDUCTIVE MEMBER FOR ELECTROPHOTOGRAPHY, PROCESS CARTRIDGE, AND ELECTROPHOTOGRAPHIC APPARATUS

CROSS-REFERENCE TO RELATED APPLICATIONS

This application is a continuation of International Application No. PCT/JP2012/008243, filed Dec. 25, 2012, which claims the benefit of Japanese Patent Application No. 2011-284453, filed Dec. 26, 2011.

BACKGROUND OF THE INVENTION

1. Field of the Invention

The present invention relates to an electro-conductive member, a process cartridge, and an electrophotographic apparatus.

2. Description of the Related Art

In an electrophotographic image-forming apparatus, an electro-conductive member has been used in various fields such as a charging roller, a developing roller, and a transfer roller. The electrical resistivity of such an electro-conductive member preferably falls within the range of $10^3$ to $10^{10}\Omega$. Accordingly, the conductivity of an electro-conductive layer which the electro-conductive member includes has been adjusted with an electro-conductive agent. Here, the electro-conductive agents are roughly classified into an electronic conductive agent typified by carbon black and an ionic conductive agent such as a quaternary ammonium salt compound. Those conductive agents each have an advantage and a disadvantage.

An electro-conductive layer that has been made conductivity with the electronic conductive agent such as carbon black shows a small change in electrical resistivity with a use environment. In addition, the electronic conductive agent hardly bleeds to the surface of the electro-conductive layer, and hence there is a small possibility that the agent contaminates the surface of a member on which an electro-conductive member including such an electro-conductive layer abuts, e.g., an electrophotographic photosensitive member (hereinafter referred to as "photosensitive member"). However, it is difficult to uniformly disperse the electronic conductive agent in a binder resin and hence the electronic conductive agent is liable to agglomerate in the electro-conductive layer. Accordingly, local unevenness of the electrical resistivity may occur in the electro-conductive layer.

On the other hand, in the case of an electro-conductive layer that has been made conductivity with the ionic conductive agent, the ionic conductive agent is uniformly dispersed in a binder resin as compared with the electronic conductive agent. Accordingly, local resistance unevenness hardly occurs in the electro-conductive layer. However, the ion-conducting performance of the ionic conductive agent is susceptible to the amount of moisture in the binder resin under a use environment. Accordingly, the electrical resistivity of the electro-conductive layer that has been made conductivity with the ionic conductive agent increases under a low-temperature, low-humidity environment (having a temperature of 15° C. and a relative humidity of 10%) (hereinafter, sometimes referred to as "L/L environment"), and reduces under a high-temperature, high-humidity environment (having a temperature of 30° C. and a relative humidity of 80%) (hereinafter sometimes referred to as "H/H environment"). That is, the electro-conductive layer involves a problem in that the environmental dependence of its electrical resistivity is large.

Further, when a direct-current voltage is applied to an electro-conductive member including the electro-conductive layer that has been made conductivity with the ionic conductive agent over a long time period, the following tendency has been observed. A cation and anion constituting the ionic conductive agent are polarized in the electro-conductive layer, an ion density in the electro-conductive layer reduces, and the electrical resistivity of the electro-conductive layer gradually increases.

Japanese Patent Application Laid-Open No. 2004-184512 discloses an electrophotographic equipment member in which the voltage dependence and environmental dependence of the resistance have been suppressed. Specifically, the literature proposes that the electrophotographic equipment member be formed with a semiconductive composition containing a binder polymer having, in its molecular structure, at least one of a sulfonic group and a sulfonic acid metal salt structure, and an electro-conductive polymer having, in its molecular structure, a surfactant structure formed with a surfactant having a sulfonic group.

SUMMARY OF THE INVENTION

In the case of a charging roller that is placed so as to abut on a photosensitive drum in an electrophotographic apparatus and charges the photosensitive drum as an example of the electro-conductive member, when the resistance of a binder resin increases under the low-temperature, low-humidity environment, a horizontal streak-like image failure may occur owing to a charging failure.

In addition, an excessive reduction in resistance of the charging roller under the high-temperature, high-humidity environment may cause a pinhole leak. The pinhole leak is the following phenomenon. When the photosensitive layer of the photosensitive drum has a faulty site, an excessive current converges from the charging roller to the faulty site, and hence a portion that cannot be charged occurs around the faulty site of the photosensitive layer.

In addition, when an ionic conductive charging roller is used in an AC/DC charging system as a system involving applying a voltage obtained by superimposing an alternating-current voltage (AC voltage) on a direct-current voltage (DC voltage) to the charging roller, a reduction in resistance of the ionic conductive charging roller under the high-temperature, high-humidity environment causes an excessive amount of a discharge current. Although the AC/DC charging system is an excellent contact charging method that is hardly affected by external circumstances such as an environment, the applied voltage oscillates and hence the total amount of the discharge current increases as compared with that in a DC charging system. As a result, the rate at which the photosensitive drum deteriorates is remarkably large as compared with that in the DC charging system, thereby shortening the lifetime of the photosensitive drum. Further, such rate causes image deletion as an image failure resulting from a discharge product such as a nitrogen oxide. Therefore, the discharge current amount needs to be additionally reduced in the AC/DC charging system. However, when the discharge current amount is insufficient, such an electrophotographic image that minute black dots occur in a spot manner over the entire surface (hereinafter, sometimes referred to as "sandy image") may occur. It has been difficult to solve the problems in the AC/DC charging system while suppressing such sandy image. Particularly under the high-temperature, high-humidity environment, a discharge current amount needed for suppressing the sandy image has become excessive owing to the reduction of the resistance of the ionic conductive charging roller in some cases.

In the case of a developing roller, which is a toner carrying member upon visualization of an electrostatic latent image formed on a photosensitive drum as a toner image, as another example of the electro-conductive member as well, an increase in resistance under the low-temperature, low-humidity environment and an excessive reduction in resistance under the high-temperature, high-humidity environment lead to challenges. When the resistance of the developing roller increases under the low-temperature, low-humidity environment, an image density may reduce. On the other hand, when the resistance of the developing roller excessively reduces under the high-temperature, high-humidity environment, the pinhole leak may occur.

The same holds true for a transfer roller as another example of the electro-conductive member. The deviation of its resistance from a proper range may affect the quality of a transferred image.

As a result of an investigation conducted by the inventors of the present invention on the electrophotographic equipment member according to Japanese Patent Application Laid-Open No. 2004-184512, the inventors have acknowledged that the member is still susceptible to improvement in terms of the flexibility of the binder resin, and the suppression of the increase of its resistance, under the low-temperature, low-humidity environment.

In view of the foregoing, the present invention is directed to providing an electro-conductive member for electrophotography showing a stable electrical resistivity under various use environments. Further, the present invention is directed to providing a process cartridge and an electrophotographic apparatus capable of stably providing high-quality electrophotographic images over a long time period.

According to one aspect of the present invention, there is provided an electro-conductive member for electrophotography, comprising: an electro-conductive mandrel; and an electro-conductive layer, wherein: the electro-conductive layer contains a binder resin having, in a molecule thereof, a sulfo group or a quaternary ammonium group as an ion exchange group, and an ion opposite in polarity to the ion exchange group; wherein: the binder resin has any structure selected from the group consisting of structures represented by a chemical formula (1)-1 and a chemical formula (1)-2, and any structure selected from the group consisting of structures represented by a chemical formula (2)-1 to a chemical formula (2)-3; and wherein the binder resin has a molecular structure preventing occurrence of a matrix-domain structure based on the binder resin in the electro-conductive layer.

$—(CF_2)_m—$ Formula (1)-1

$—(CF_2—CF_2—O)_n—$ Formula (1)-2

$—(CH_2—CH_2—O)_p—$ Formula (2)-1

$—(CH_2—CHCH_3—O)_q—$ Formula (2)-2

$—(CH_2—CH_2—CH_2—CH_2—O)_r—$ Formula (2)-3

Provided that, in the formula (1)-1, m represents an integer of 2 or more and 20 or less, in the formula (1)-2, n represents an integer of 5 or more and 50 or less, in the formula (2)-1, p represents an integer of 1 or more and 25 or less, in the formula (2)-2, q represents an integer of 1 or more and 15 or less, and in the formula (2)-3, r represents an integer of 1 or more and 12 or less.

According to another aspect of the present invention, there is provided a process cartridge, comprising the above-described electro-conductive member, wherein the process cartridge is detachably mountable to a main body of an electrophotographic apparatus. According to further aspect of the present invention, there is provided an electrophotographic apparatus comprising the above-described electro-conductive members.

According to the present invention, there is provided the electro-conductive member for electrophotography in which the electrical resistivity shows low environmental dependence and always shows a stable state. Further, according to the present invention, provided are the process cartridge and the electrophotographic apparatus capable of stably providing high-quality electrophotographic images over a long time period.

Further features of the present invention will become apparent from the following description of exemplary embodiments with reference to the attached drawings.

DESCRIPTION OF THE EMBODIMENTS

Figure 1A:
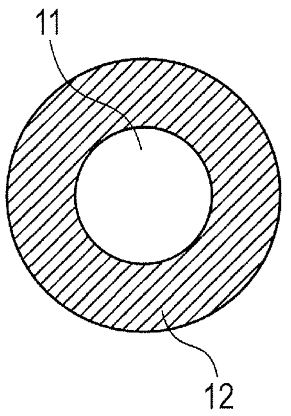
FIG. 1A is a schematic sectional view illustrating an example of an electro-conductive member according to the present invention.

Preferred embodiments of the present invention will now be described in detail in accordance with the accompanying drawings.

The term “matrix-domain structure” as used herein refers to the following structure. A structure having a fluorine atom represented by a chemical formula (1)-1 or a chemical formula (1)-2 and an alkylene oxide structure represented by any one of a chemical formula (2)-1 to a chemical formula (2)-3, the structures constituting a binder resin, are each unevenly distributed, a phase containing one of the structures constitutes a matrix, and a phase containing the other structure forms a domain in the matrix. In addition, the phrase “preventing the occurrence of a matrix-domain structure” as used herein means that the matrix-domain structure is not formed by the molecular structure of the binder resin itself.

The conductive member according to the present invention is an electro-conductive member for electrophotography, including: an electro-conductive mandrel; and an electro-conductive layer, in which: the electro-conductive layer contains a binder resin having, in a molecule thereof, a sulfo group or a quaternary ammonium group as an ion exchange group, and an ion opposite in polarity to the ion exchange group; the binder resin has any structure selected from the group consisting of structures represented by a chemical formula (1)-1 and a chemical formula (1)-2, and any structure selected from the group consisting of structures represented by a chemical formula (2)-1 to a chemical formula (2)-3; and the binder resin has a molecular structure preventing occurrence of a matrix-domain structure based on the binder resin in the electro-conductive layer.

$$-(CF_2)_m- \quad \text{Formula (1)-1}$$

$$-(CF_2-CF_2-O)_n- \quad \text{Formula (1)-2}$$

$$-(CH_2-CH_2-O)_p- \quad \text{Formula (2)-1}$$

$$-(CH_2-CHCH_3-O)_q- \quad \text{Formula (2)-2}$$

$$-(CH_2-CH_2-CH_2-CH_2-O)_r- \quad \text{Formula (2)-3}$$

In the formula (1)-1, m represents an integer of 2 or more and 20 or less, in the formula (1)-2, n represents an integer of 5 or more and 50 or less, in the formula (2)-1, p represents an integer of 1 or more and 25 or less, in the formula (2)-2, q represents an integer of 1 or more and 15 or less, and in the formula (2)-3, represents an integer of 1 or more and 12 or less.

The inventors of the present invention have considered the following. In order that the electrical resistivity of an electro-conductive member for electrophotography may be optimized independent of a use environment, an investigation needs to be conducted on how an increase in resistance under a low-temperature, low-humidity environment can be suppressed while an excessive reduction in resistance is suppressed by reducing the amount of moisture in a binder resin under a high-temperature, high-humidity environment.

A conductivity σ representing an electrical characteristic can be represented by the following numerical expression 1.

$$\sigma = ed\mu \quad \text{(Numerical expression 1)}$$

Here, σ represents the conductivity, represents the charge of a carrier, d represents a carrier density, and μ represents a carrier mobility. A carrier in the case of ionic conduction is an ionic conductive agent ionized by the dissociation of an anion and a cation. In general, the ionic conductive agent is formed of an ion exchange group such as a quaternary ammonium group and an ion opposite in polarity to the group (such as a chloride ion), and shows ionic conductivity as a result of the movement of both the group and the ion in the binder resin.

Water in the binder resin has an action of increasing the carrier density d in the numerical expression 1 because the water promotes the ionic dissociation of the ionic conductive agent. Further, the presence of water having a low viscosity in the binder resin increases the mobility μ because the presence facilitates the migration of an ion. In other words, the major factor for a large change in electrical resistivity of the electro-conductive member with a use environment may be a change in amount of moisture in the binder resin.

In view of the foregoing, the inventors of the present invention have conducted an investigation on the optimization of the electrical resistivity independent of a use environment. As a result, the inventors of the present invention have found that it is effective to introduce, into the main chain of the binder resin, a structure in which a fluorine-containing structure and an alkylene oxide structure are alternately or randomly crosslinked. That is, the inventors have found that the amount of moisture in the high-temperature, high-humidity environment can be reduced by the hydrophobicity of the fluorine-containing structure, and ionic conductivity in the low-temperature, low-humidity environment can be improved by the ionic dissociation-promoting action and flexibility of the alkylene oxide structure.

(Fluorine-Containing Structure)

That is, the inventors have found that a fluctuation in electrical resistivity with an environment can be suppressed with additional reliability when the electro-conductive layer contains an ionic conductive binder resin having, in a molecule thereof, a sulfo group or a quaternary ammonium group as an ion exchange group and an ion opposite in polarity to the ion exchange group, the binder resin has at least one structure selected from the group consisting of the structures represented by the formula (1)-1 and the formula (1)-2, and at least one structure selected from the group consisting of the structures represented by the formula (2)-1 to the formula (2)-3, and the binder resin has a molecular structure preventing the occurrence of a matrix-domain structure in the electro-conductive layer.

Such a structure having a fluorine atom as represented by the formula (1)-1 or the formula (1)-2 may improve the hydrophobicity of the binder resin. In other words, an excessive reduction in resistance of the binder resin can be suppressed because the absorption of moisture can be suppressed under the high-temperature, high-humidity environment. The foregoing corresponds to the reductions of the carrier density d and mobility μ in the numerical expression 1 in the high-temperature, high-humidity environment.

In addition, the structure represented by the formula (1)-1 or the formula (1)-2 is preferred from the following viewpoint. The structure hardly becomes wet with various liquids as well as with water and has such a characteristic as to hardly adhere, and hence the use of the structure as the electro-conductive layer on the outermost surface of the conductive member can reduce the adhesion of a contaminant such as toner or the external additive of the toner.

(Alkylene Oxide Structure)

Further, an investigation conducted by the inventors of the present invention has found that any one of the alkylene oxide structures represented by the formula (2)-1 to the formula (2)-3 is needed in the binder resin according to the present invention for suppressing an increase in resistance of the resin under the low-temperature, low-humidity environment. The alkylene oxide structure may be able to suppress the increase of the resistance of the binder resin even under the low-temperature, low-humidity environment where the amount of moisture in the binder resin is small because the alkylene oxide structure has an action of promoting the dissociation of an ion as with water. The foregoing corresponds to the increase of the carrier density d in the low-temperature, low-humidity environment.

Further, the flexibility of the binder resin improves because the alkylene oxide structures represented by the formula (2)-1 to the formula (2)-3 are each a flexible structure. An improvement in flexibility of the binder resin activates a molecular motion in the structure of the binder resin, thereby significantly improving the mobility of an ion. An improvement in mobility of the ion may be able to suppress an increase in resistance of the binder resin even under the low-temperature, low-humidity environment where the amount of moisture in the binder resin is small and the dissociation of the ion hardly occurs. The foregoing corresponds to the increase of the mobility μ in the low-temperature, low-humidity environment.

Further, each of the structures represented by the formula (2)-2 and the formula (2)-3 can probably be expected to reduce the water-absorbing property of the binder resin under the high-temperature, high-humidity environment to additionally alleviate the fluctuation of the electrical resistivity with an environment because the structure is not only a structure excellent in flexibility but also a structure having relatively high hydrophobicity.

(Ionic Conductive Agent)

The binder resin needs to include an ionic conductive component in order that ionic conduction may be expressed. For example, an approach involving dispersing a low-molecular weight ionic conductive agent is generally available. However, when an attempt is made to disperse the ionic conductive agent in the binder resin having high hydrophobicity like the present invention, the ionic conductive agent is present in a phase-separated state in the electro-conductive layer, which causes the unevenness of the electrical resistivity of the electro-conductive layer. Further, in general, when an ionic conductive agent having high polarity is not fixed to the binder resin, an ion is liable to migrate in the binder resin, and hence the agent dissociates into an anion and a cation owing to its long-term use or standing, and each ion is liable to be unevenly distributed toward an interface opposite in polarity. As a result, the following problems arise. The resistance of the binder resin increases owing to the absence of the migration of an ion, or the ionic conductive agent bleeds to any other member.

On the other hand, when a sulfo group or a quaternary ammonium group is incorporated as an ion exchange group into a molecule of the binder resin and a molecular structure containing an ion opposite in polarity to the ion exchange group is introduced into the electro-conductive layer, none of an anion and a cation is unevenly distributed unlike the foregoing. Further, the ion exchange group is fixed to a structure in the molecule and only a counter ion opposite in polarity to the ion exchange group contributes to the ionic conduction, and hence the bleeding to the other member does not occur.

(Domain)

Further, the binder resin according to the present invention has such a molecular structure as to prevent the occurrence of a matrix-domain structure in the electro-conductive layer. In general, the matrix-domain structure occurs owing to the phase separation of resins having low compatibility when multiple kinds of resin components are mixed.

When the structure having a fluorine atom and the alkylene oxide structure are each unevenly distributed to form the matrix-domain structure in the binder resin, the migration of an ion is inhibited at an interface between a matrix and a domain, and hence an effect of the present invention cannot be sufficiently obtained.

In the binder resin according to the present invention, in order that the matrix-domain structure based on the binder resin may be prevented from being formed in the electro-conductive layer, it is effective to reduce the number of repeating units in the fluorine-containing structure and alkylene oxide structure constituting the binder resin, or to alternately bond the fluorine-containing structure and the alkylene oxide structure.

<Structure of Electro-Conductive Member>

The present invention is described in detail below by way of a roller-shaped electro-conductive roller, charging roller, or development roller as a representative example of the electro-conductive member.

Figure 1B:
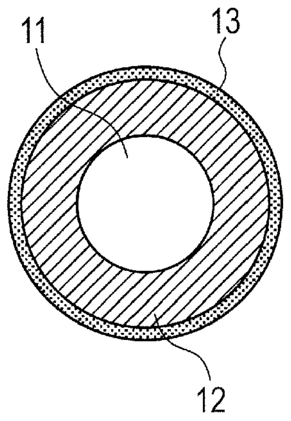
FIG. 1B is a schematic sectional view illustrating an example of the conductive member according to the present invention.
Figure 1C:
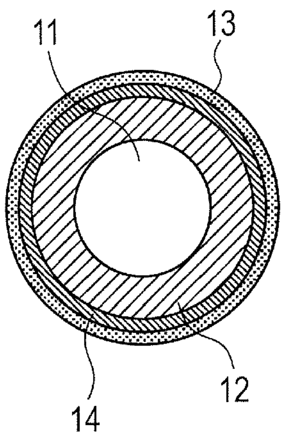
FIG. 1C is a schematic sectional view illustrating an example of the conductive member according to the present invention.

FIGS. 1A to 1C are each a schematic view illustrating an aspect of the electro-conductive member according to the present invention. The roller-shaped electro-conductive member is, for example, as illustrated in FIG. 1A, constructed of an electro-conductive mandrel 11 and an elastic layer 12 which is provided on the outer periphery of the electro-conductive mandrel 11. The elastic layer 12 is an electro-conductive layer containing the binder resin according to the present invention. In addition, the electro-conductive member may be such that a surface layer 13 is formed on the surface of the elastic layer 12 as illustrated in FIG. 1B. In this case, at least one of the elastic layer 12 and the surface layer 13 is an electro-conductive layer formed of the binder resin according to the present invention, and is substantially responsible for the control of the electrical resistivity of a charging member of the present invention. Further, the electro-conductive member may be of a three-layer structure in which an intermediate layer 14 is placed between the elastic layer 12 and the surface layer 13 as illustrated in FIG. 1C, or a multilayer construction in which the multiple intermediate layers 14 are placed. In this case, at least one of those layers is an electro-conductive layer formed of the binder resin according to the present invention, and is substantially responsible for the control of the electrical resistivity of the charging member of the present invention.

<Electro-Conductive Mandrel>

A mandrel appropriately selected from those known in the field of an electro-conductive member for electrophotography can be used as the electro-conductive mandrel. The mandrel is, for example, a column obtained by plating the surface of a carbon steel alloy with nickel having a thickness of about 5 μm.

<Electro-Conductive Layer>

Hereinafter, the fluorine-containing structure, the alkylene oxide structure, a linking structure of the fluorine-containing structure and the alkylene oxide structure, and the ion exchange group and the ion opposite in polarity thereto constituting the electro-conductive layer according to the present invention, and a method of producing the binder resin according to the present invention are described.

(Fluorine-Containing Structure)

The following is important as an example of means for suppressing an excessive reduction in resistance of the binder resin under the high-temperature, high-humidity environment. The binder resin has, in its molecular main chain, any structure selected from the group consisting of the structures represented by the chemical formula (1)-1 and the chemical formula (1)-2. Such a structure having a fluorine atom as represented by the chemical formula (1)-1 or the chemical formula (1)-2 may improve the hydrophobicity of the binder resin. In other words, the absorption of moisture can be suppressed under the high-temperature, high-humidity environment, and hence the amount of moisture in the binder resin can be reduced and the excessive reduction of its electrical resistivity can be suppressed. The foregoing corresponds to the reductions of the carrier density d and mobility μ in the numerical expression 1 in the high-temperature, high-humidity environment.

Further, the structure represented by the chemical formula (1)-1 or the chemical formula (1)-2 is preferred from the following viewpoint. The structure hardly becomes wet with various liquids as well as with water and has such a characteristic as to hardly adhere, and hence the use of the structure as the electro-conductive layer on the outermost surface of the electro-conductive member can reduce the adhesion of a contaminant such as toner or the external additive of the toner.

The following is available as an example of a method of introducing the fluorine-containing structure into the binder resin. A fluorine-containing compound having, at each of both terminals of the structure represented by the chemical formula (1)-1 or the chemical formula (1)-2, a reactive functional group such as a glycidyl group, a hydroxyl group, or a carboxyl group has only to be used as a raw material. At that time, the selection of the molecular weight of the fluorine-containing structure as a raw material is important.

The number of repetitions of a $CF_2$ structure in the binder resin needs to be set to an amount causing the binder resin to express hydrophobicity and flexibility. When the number m of repetitions of the $CF_2$ structure in the structure represented by the chemical formula (1)-1 is excessively small, the hydrophobicity is not expressed. In contrast, when the number m of repetitions of the $CF_2$ structure is excessively large, a C—F bond is liable to form a rigid molecular chain, and hence there is a possibility that the flexibility is lost and the conductivity reduces. When the number n of repetitions in the structure represented by the chemical formula (1)-2 is excessively large, the water-absorbing property is raised and the amount of moisture in the binder resin increases, and hence an excessive reduction of its resistance may be caused under the high-temperature, high-humidity environment. In addition, the crystallization of the binder resin occurs and hence a domain is liable to be formed. Therefore, m in the chemical formula (1)-1 preferably represents 2 or more and 20 or less, and n in the chemical formula (1)-2 preferably represents 5 or more and 50 or less. m in the chemical formula (1)-1 more preferably represents 6 or more and 8 or less, and n in the chemical formula (1)-2 more preferably represents 10 or more and 15 or less.

The content of the $CF_2$ structure in the binder resin according to the present invention is preferably 20 mass % or more with respect to the total mass of the binder resin in order that its amount of moisture under the high-temperature, high-humidity environment may be suppressed. In addition, the content is more preferably 30 mass % or more in consideration of its use as the surface layer of an electro-conductive roller because the surface free energy of the electro-conductive roller reduces and hence the adhesion of foreign matter such as toner or the external additive of the toner can be reduced.

In addition to the binder resin of the present invention, a roughness imparting particle, a filler, a softening agent, or the like may be added to the electro-conductive layer of the present invention to such an extent that the effect of the present invention is not impaired. The content of the binder resin is preferably 20 mass % or more with respect to the electro-conductive layer. More specifically, the content is preferably 40 mass % or more with respect to the electro-conductive layer. This is because of the following reason. The electro-conductive layer shows ionic conductivity as a result of the formation of a continuous phase by the binder resin therein and setting the content of the binder resin to 40 mass % or more facilitates the formation of the continuous phase.

(Alkylene Oxide Structure)

The alkylene oxide structure is needed in the structure of the binder resin for suppressing the increase of its resistance under the low-temperature, low-humidity environment. The alkylene oxide structure may be able to suppress the increase of the resistance of the binder resin under the low-temperature, low-humidity environment even under such a condition that the amount of moisture in the binder resin is small because the structure has a promoting effect on the dissociation of an ion as with water. The foregoing corresponds to the increase of the carrier density d in the low-temperature, low-humidity environment.

Further, the flexibility of the binder resin improves because the alkylene oxide structure is a flexible structure. An improvement in flexibility of the binder resin activates a molecular motion in the structure of the binder resin, thereby significantly improving the mobility of an ion. An improvement in mobility of the ion may be able to suppress an increase in resistance of the binder resin even under the low-temperature, low-humidity environment where the amount of moisture in the binder resin is small and the dissociation of the ion hardly occurs. The foregoing corresponds to the increase of the mobility μ in the low-temperature, low-humidity environment.

Specific examples of the alkylene oxide include ethylene oxide (EO), propylene oxide, butylene oxide, and an α-olefin oxide. One kind, or two or more kinds, of those alkylene oxides can be used as required. From the viewpoint of ionic dissociation, particularly when ethylene oxide (EO) represented by the chemical formula (2)-1 out of the alkylene oxides is used, the increase of the resistance under the low-temperature, low-humidity environment can be suppressed. However, when the introduction amount of ethylene oxide (EO) is large, the water content of the binder resin under the high-temperature, high-humidity environment increases because ethylene oxide (EO) has extremely high hydrophilicity as compared with that of any other alkylene oxide.

By the foregoing reasons, the content of ethylene oxide (EO) in the binder resin preferably falls within the range of 30 mass % or less. Setting the content to 30 mass % or less can prevent an excessive reduction in resistance of the binder resin under the high-temperature, high-humidity environment, and hence can suppress the occurrence of abnormal discharge due to a leak resulting from the resistance reduction. An investigation conducted by the inventors of the present invention has confirmed that when the content of the ethylene oxide structure in the binder resin exceeds 30 mass %, the electrical resistivity of the binder resin in the low-temperature, low-humidity environment tends to change largely. This may be because ethylene oxide forms a continuous phase in the binder resin.

Propylene oxide represented by the chemical formula (2)-2 or butylene oxide represented by the chemical formula (2)-3 may be used as the alkylene oxide. Even when such structure is used, the ionic dissociation property and flexibility of the binder resin can be improved, and hence an increase in resistance of the binder resin under the low-temperature, low-humidity environment can be suppressed. In addition, such structure does not have hydrophilicity as large as that of ethylene oxide. Accordingly, even when its content in the binder resin is large, the amount of moisture of the binder resin under the high-temperature, high-humidity environment does not largely increase, and hence the reduction of its resistance can be suppressed. The butylene oxide structure is particularly suitable because the structure has high hydrophobicity as compared with that of the propylene oxide structure and contributes to the flexibilization of the binder resin.

The ethylene oxide structure is suitable as an alkylene oxide structure to be introduced into the binder resin for suppressing the increase of its resistance under the low-temperature, low-humidity environment, and propylene oxide and butylene oxide are each suitable for alleviating the dependence of its electrical resistivity on a use environment.

The following is available as an example of a method of introducing the alkylene oxide into the binder resin according to the present invention. An alkylene oxide compound having, at each of both terminals of any one of the structures represented by the chemical formula (2)-1 to the chemical formula (2)-3, a reactive functional group such as a glycidyl group, an amino group, a hydroxyl group, a mercapto group, or an isocyanate group has only to be used as a raw material. At that time, the selection of the molecular weight of the alkylene oxide structure as a raw material is important. Increasing a value for each of p, q, and r in the chemical formula (2)-1 to the chemical formula (2)-3 each representing the number of linked minimum units widens an intermolecular distance between crosslinking points. As a result, the hydrophobicity and flexibility of the binder resin improve, and hence the environmental dependence of its electrical resistivity can be additionally alleviated.

On the other hand, when the value for each of p, q, and r in the structures represented by the chemical formula (2)-1 to the chemical formula (2)-3 is excessively increased, the crystallization of the alkylene oxide structure occurs and hence a matrix-domain structure is liable to be formed. The foregoing is remarkable particularly in the case of a compound having the structure represented by the chemical formula (2)-1. In addition, the number of reactive functional groups contributing to a crosslinking reaction reduces and hence the crosslinking reaction hardly occurs. Accordingly, the amount of an unreacted raw material may increase after the production of the binder resin. By such reasons as described above, p in the chemical formula (2)-1 is preferably set to 1 or more and 25 or less, q in the chemical formula (2)-2 is preferably set to 1 or more and 15 or less, and r in the chemical formula (2)-3 is preferably set to 1 or more and 12 or less.

The content of the alkylene oxide in the binder resin is preferably 5 mass % or more and 80 mass % or less. More specifically, the content is preferably 10 mass % or more and 60 mass % or less. When the content is 10 mass % or more, the resistance of the resin can be reduced under the low-temperature, low-humidity environment. When the content is 60 mass % or less, an excessive reduction of the resistance under the high-temperature, high-humidity environment can be prevented. It should be noted that the term "content of the alkylene oxide" as used herein refers to the total amount of all alkylene oxides such as propylene oxide, butylene oxide, and ethylene oxide.

The kind and content of the alkylene oxide structure in the binder resin can be calculated as described below. Part of the electro-conductive layer is cut out, an extraction operation is performed with a solvent such as ethanol, the resultant extraction residue is subjected to solid $^{13}$C-NMR measurement, and a peak position and an intensity ratio are analyzed. Further, the quantitative determination of the alkylene oxide is additionally facilitated by identifying its molecular structure by infrared spectroscopic (IR) analysis and combining the result with the result of the NMR measurement.

(Linking Group)

The binder resin according to the present invention preferably contains a structure obtained by linking any structure selected from the group consisting of the structures represented by the chemical formula (1)-1 and the chemical formula (1)-2, and any structure selected from the group consisting of the structures represented by the chemical formula (2)-1 to the chemical formula (2)-3 with a linking group containing at least one structure selected from the group consisting of structures represented by the following chemical formula (3)-1 to the following chemical formula (3)-6.

Formula (3)-1

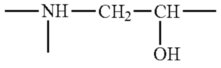

Formula (3)-2

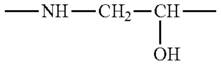

Formula (3)-3

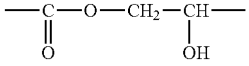

-continued

Formula (3)-4

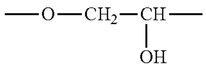

Formula (3)-5

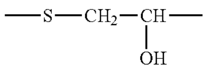

Formula (3)-6

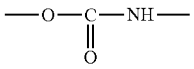

The structure of the linking portion can be produced by causing a compound having the fluorine-containing structure and a compound having the alkylene oxide structure to form a three-dimensional crosslinkage through an epoxy bond represented by any one of the chemical formula (3)-1 to the chemical formula (3)-5 or a urethane bond represented by the chemical formula (3)-6. It is because the structure of such linking portion is a structure having large polarity and hence serves to promote the dissociation of the ion exchange group in the binder resin.

Further, the binder resin according to the present invention preferably contains a structure obtained by linking any structure selected from the group consisting of the structures represented by the chemical formula (1)-1 and the chemical formula (1)-2, and any structure selected from the group consisting of the structures represented by the chemical formula (2)-1 to the chemical formula (2)-3 with a linking group containing at least any structure selected from the group consisting of structures represented by the following chemical formula (4)-1 to the following chemical formula (4)-3. This is because of the following reason. When the ion exchange group is introduced through such molecular structure, a polar group around the ion exchange group promotes the dissociation of an ion and hence the electrical resistivity under the L/L environment can be additionally reduced.

Formula (4)-1

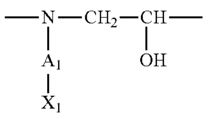

Formula (4)-2

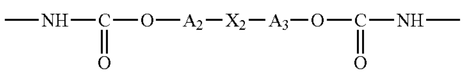

Formula (4)-3

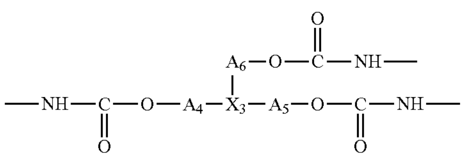

In the formulae, $A_1$ to $A_6$ each represent a divalent organic group and $X_1$ to $X_3$ each represent the ion exchange group.

(Such Molecular Structure as to Prevent Occurrence of Domain)

Further, the binder resin according to the present invention has such a molecular structure as to prevent the occurrence of a matrix-domain structure.

In the present invention, when the fluorine-containing structure and the alkylene oxide structure are each unevenly distributed to form a matrix-domain structure in the binder resin, the migration of an ion is inhibited at an interface between a matrix and a domain, and hence the effect of the present invention cannot be sufficiently obtained.

In order that the matrix-domain structure may be prevented from occurring in the binder resin, the number of linked units in each of the fluorine-containing structure and the alkylene oxide structure has only to be reduced, or the fluorine-containing structure and the alkylene oxide structure have only to be alternately bonded. It should be noted that the binder resin itself according to the preset invention has only to form a continuous phase in the electro-conductive layer, and the formation of a sea-island structure by any other resin, filler, particle, or the like added to the electro-conductive layer to such an extent that the effect of the present invention is not impaired together with the binder resin according to the present invention is permitted.

The presence or absence of the matrix-domain structure based on the binder resin can be confirmed with a transmission electron microscope (TEM) and a scanning electron microscope (SEM-EDX). Specifically, a sample cut out of the electro-conductive layer is embedded in a normal temperature-curable epoxy resin and then the resin is cured. After that, a sample for observation is produced by processing the resultant into a thin film shape having a thickness of 100 to 300 nm with a microtome. Next, the sample for observation is photographed with the TEM at a magnification of 10,000 and a portion of the resultant photograph where a continuous phase is formed is marked. Subsequently, the elemental analysis of the sample for observation is performed with the SEM-EDX. When it can be confirmed that the marked portion is the binder resin according to the present invention, success is achieved.

(Ion Exchange Group)

The ion exchange group according to the present invention is a functional group having ionic dissociation property, and is bonded to the molecular chain of the binder resin according to the present invention through a covalent bond. The ion exchange group according to the present invention is one of a sulfo group and a quaternary ammonium group each having high ion-dissociating performance. That the ion exchange group is covalently bonded to the binder resin is advantageous to the bleeding of the ionic conductive agent and long-term electrification durability.

The ion exchange group can be introduced into the main chain of the binder resin, or can be introduced to a molecular terminal thereof. When the ion exchange group is introduced into the main chain of the binder resin, the binder resin preferably has, for example, any one of the structures represented by the chemical formula (4)-1 to the chemical formula (4)-3. When the ion exchange group is introduced to the molecular terminal, the binder resin preferably has, for example, any one of the structures represented by the following chemical formula (5)-1 to the following chemical formula (5)-5. When the ion exchange group is introduced through such molecular structure, a polar group around the ion exchange group promotes the dissociation of an ion and hence the electrical resistivity under the low-temperature, low-humidity environment can be additionally reduced. In addition, the ion exchange group is preferably introduced to a molecular terminal of the binder resin from the viewpoint of suppressing the increase of its resistance under the low-temperature, low-humidity environment. This may be because the molecular mobility of the ion exchange group in the case where the ion exchange group is introduced to the molecular terminal improves as compared with that in the case where the ion exchange group is introduced into the main chain.

Formula (5)-1

$-NH-A_7-X_4$

Formula (5)-2

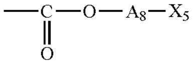

Formula (5)-3

$-O-A_9-X_6$

Formula (5)-4

$-S-A_{10}-X_7$

Formula (5)-5

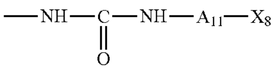

Provided that, in the formulae, $A_7$ to $A_{11}$ each represent a divalent organic group and $X_4$ to $X_8$ each represent the ion exchange group.

(Ion Opposite in Polarity to Ion Exchange Group)

The electro-conductive layer according to the present invention contains an ion having polarity opposite to the polarity of the ion exchange group (hereinafter referred to as "counter ion").

When the ion exchange group is a sulfo group, examples of the counter ion include cations such as a proton, alkali metal ions, e.g., a lithium ion, a sodium ion, and a potassium ion, an ion of an imidazolium compound, an ion of a pyrrolidinium compound, and an ion of a quaternary ammonium compound.

When the ion exchange group is a quaternary ammonium group, examples of the counter ion include anions such as halide ions, e.g., a fluoride ion, a chloride ion, a bromide ion, and an iodide ion, a perchlorate ion, an ion of a sulfonic acid compound, an ion of a phosphoric acid compound, an ion of a boric acid compound, and a sulfonylimide ion.

Of the ion species, a sulfonylimide ion, an imidazolium ion, or a pyrrolidinium ion is preferred as the counter ion because it is preferred that the electro-conductive layer according to the present invention can achieve the suppression of the increase of the resistance under the low-temperature, low-humidity environment. A combination of such counter ion and the ion exchange group is suitable from the following viewpoint. The combination shows the properties of an ionic liquid, and hence exists as a liquid even in a state where the amount of moisture in the binder resin is small and can migrate in the binder resin. Accordingly, the increase of the resistance under the low-temperature, low-humidity environment can be alleviated. The term "ionic liquid" as used herein refers to a molten salt having a melting point of 100° C. or less. Further, the sulfonylimide ion is suitable from the following viewpoint. The ion has high hydrophobicity and hence its affinity for the binder resin according to the present invention easily improves as compared with that of a general ion having high hydrophilicity. As a result, the ion is uniformly dispersed in the binder resin and hence the unevenness of the electrical resistivity resulting from dispersion unevenness can be additionally reduced.

Specific examples of the sulfonylimide ion include, but are not limited to, bis(trifluoromethanesulfonyl)imide ion, bis(pentafluoromethanesulfonyl)imide ion, bis(nonafluorobutanesulfonyl)imide ion, and cyclo-hexafluoropropane-1,3-bis(sulfonyl)imide ion.

The presence of the counter ion in the electro-conductive layer can be verified by an extraction experiment involving utilizing an ion-exchange reaction. An ionic conductive resin is stirred in a dilute aqueous solution of hydrochloric acid or sodium hydroxide, followed by the extraction of an ion in the ionic conductive resin in the aqueous solution. The aqueous solution after the extraction is dried and then an extract is collected. After that, the extract is subjected to mass spectrometry with a time-of-flight mass spectrometer (TOF-MS). Thus, the ion can be identified. Further, the identification of the ion according to the present invention is additionally facilitated by performing elemental analysis through the inductively coupled plasma (ICP) emission spectrometry of the extract and combining the result with the result of the mass spectrometry.

<Method of Producing Binder Resin>

The ionic conductive binder resin according to the present invention can be produced with, for example, the following raw materials (1) and (2) by the following method.

(1) Ionic Conductive Agent as Raw Material

The ionic conductive agent as a raw material for the present invention is an ionic conductive agent having: a reactive functional group that reacts with the binder resin; and the ion exchange group that is one of a quaternary ammonium group and a sulfonic group. A desired ion can be introduced as the counter ion by an ion-exchange reaction. It should be noted that examples of the reactive functional group include halogen atoms (e.g., fluorine, chlorine, bromine, and iodine atoms), a carboxyl group, an acid group of an acid anhydride or the like, a hydroxyl group, an amino group, an mercapto group, an alkoxyl group, a vinyl group, a glycidyl group, an epoxy group, a nitrile group, and a carbamoyl group, and any of those may be used as long as it can be caused to react with the binder resin as a raw material.

The counter ion can be produced by using an ion exchange reaction between a salt of an ion having a desired chemical structure and an ionic conductive agent having a reactive functional group. For example, when lithium bis(trifluoromethanesulfonyl)imide and glycidyltrimethylammonium chloride are used as the salt of an ion and the ionic conductive agent having a reactive functional group, respectively, first, each of them is dissolved in purified water. When these two aqueous solutions are mixed and stirred, a chloride ion having high ion exchangeability is substituted with a bis(trifluoromethanesulfonyl)imide ion by an ion exchange reaction. In this case, produced glycidyltrimethylammonium bis(trifluoromethanesulfonyl)imide is an ionic liquid exhibiting hydrophobicity, thus water-soluble lithium chloride as a by-product can be easily removed. In the case where the reactive ionic conductive agent obtained by the above-mentioned method is hydrophilic, a by-product can be easily removed by using a solvent such as chloroform, dichloromethane, dichloroethane, or methyl isobutyl ketone. Thus, the ionic conductive agent as a raw material of the present invention can be produced.

(2) Binder Resin as Raw Material

The binder resin as a raw material is not particularly limited as long as it can be caused to react with the reactive functional group contained in the ionic conductive agent, and examples thereof include, but are not limited to, a compound having two or more reactive functional groups and a compound that is polymerizable by itself, such as a polyglycidyl compound, a polyamine compound, a polycarboxy compound, a polyisocyanate compound, a polyhydric alcohol compound, a polyisocyanate compound, a phenolic compound, and a vinyl compound.

(3) Production of Binder Resin According to the Present Invention

The binder resin according to the present invention can be produced by causing the ionic conductive agent as a raw material and the binder resin as a raw material to react with each other. The ionic conductive agent is preferably blended at a ratio of 0.5 part by mass or more and 20 parts by mass or less with respect to 100 parts by mass of the binder resin as a raw material. When the blending amount is 0.5 part by mass or more, a conductivity-providing effect by the addition of the conductive agent can be easily obtained. When the blending amount is 20 parts by mass or less, the environmental dependence of the electrical resistivity can be reduced.

It should be noted that a method of introducing the ion opposite in polarity to the ion exchange group is not limited to the foregoing method and, for example, the following method may be adopted. A binder is produced with an ionic conductive agent having a proton or a halogen ion, and is then substituted with the ion according to the present invention by ion exchange.

Whether or not the ion exchange group is bonded to the binder resin through a covalent bond can be confirmed by the following method. The presence or absence of the bonding of the ion exchange group can be confirmed by: cutting out part of the electro-conductive layer; performing an extraction operation with a solvent such as ethanol; and subjecting the resultant extract and extraction residue to infrared spectroscopic (IR) analysis. Similarly, molecular structures including the ion exchange group can be identified by subjecting the resultant extract and extraction residue to solid $^{13}$C-NMR measurement and mass spectrometry with a time-of-flight mass spectrometer (TOF-MS).

<Any Other Component>

A filler, a softening agent, a processing aid, a tackifier, an anti-adhesion agent, a dispersant, and a foaming agent which have been generally used as resin compounding agents can each be added to the electro-conductive layer according to the present invention to such an extent that the effect of the present invention is not impaired.

(Electrical Resistivity of Each Layer)

As a guide, the electrical resistivity of each layer forming the electro-conductive member according to the present invention is $1\times10^3$ Ω·cm or more and $1\times10^9$ Ω·cm or less. In particular, the electrical resistivity of the electro-conductive layer according to the present invention is preferably set to $1\times10^5$ Ω·cm or more and $1\times10^8$ Ω·cm or less.

When the electrical resistivity of the electro-conductive layer according to the present invention is set to $1\times10^5$ Ω·cm or more, the occurrence of abnormal discharge due to a leak can be suppressed as long as the electrical resistivity of any other layer forming the electro-conductive member of the present invention is $1\times10^3$ Ω·cm or more and $1\times10^9$ Ω·cm or less. When the electrical resistivity of the electro-conductive layer according to the present invention is set to $1\times10^8$ Ω·cm or less, the occurrence of an image detrimental effect due to an insufficient resistance can be suppressed as long as the electrical resistivity of any other layer forming the electro-conductive member of the present invention is $1\times10^3$ Ω·cm or more and $1\times10^9$ Ω·cm or less.

(Material for Elastic Layer)

When the electro-conductive layer according to the present invention is used as a surface layer 13 as illustrated in FIG. 1B, a rubber component for forming the elastic layer 12 is not particularly limited and a rubber known in the field of an electro-conductive member for electrophotography can be used. Specifically, an epichlorohydrin homopolymer, an epichlorohydrin-ethylene oxide copolymer, an epichlorohydrin-ethylene oxide-allylglycidyl ether terpolymer, an acrylonitrile-butadiene copolymer, a hydrogenated product of an acrylonitrile-butadiene copolymer, a silicone rubber, an acrylic rubber, a urethane rubber, and the like may be used.

In addition, as a guide, the electrical resistivity of the rubber component is $1\times10^3$ Ω·cm or more and $1\times10^9$ Ω·cm or less. However, an effect is exerted when the electrical resistivity is set to $1\times10^4$ Ω·cm or more and $1\times10^8$ Ω·cm or less. Setting the electrical resistivity to $1\times10^5$ Ω·cm or more can suppress the occurrence of abnormal discharge due to a leak, and setting the electrical resistivity to $1\times10^8$ Ω·cm or less can suppress the occurrence of an image detrimental effect due to an insufficient resistance.

(Material for Surface Layer)

When the electro-conductive layer according to the present invention is used as the elastic layer 12 as illustrated in FIG. 1B, or used as the intermediate layer 14 as illustrated in FIG. 1C, a resin known in the field of an electro-conductive member for electrophotography can be used for a material for forming the surface layer 13. Specific examples include an acrylic resin, a polyurethane, a polyamide, a polyester, a polyolefin, and a silicone resin. The resin for forming the surface layer may include, as needed, carbon black, graphite, an electro-conductive oxide such as tin oxide, a metal such as copper or silver, electro-conductive particles which obtains conductivity by being covered on its surface with the oxide or metal, or an ionic conductive agent having ion exchange capacity such as a quaternary ammonium salt.

<Process Cartridge and Electrophotographic Apparatus>

The electro-conductive member according to the present invention can be suitably used as, for example, a charging member for abutting on a member to be charged such as a photosensitive drum to charge the member to be charged. In addition, as another example, the member can be suitably used as a developing member that is a toner carrying member upon visualization of an electrostatic latent image on the member to be charged such as the photosensitive drum as a toner image. In addition, as another example, the member can be suitably used as a transferring member for transferring the toner image on the photosensitive drum onto a transfer material.

Further, in a process cartridge having an image-bearing member and a charging member, the process cartridge being detachably mountable to the main body of an electrophotographic apparatus, the electro-conductive member according to the present invention can be suitably used as the charging member or the developing member. Further, in an electrophotographic apparatus having a mechanism for transferring a toner image on a photosensitive drum with a transferring member, the electro-conductive member according to the present invention can be suitably used as the transferring member.

It should be noted that the electro-conductive member according to the present invention can be used as a charge-removing member or a conveying member such as a sheet-feeding roller in addition to the charging member, the developing member, and the transferring member.

Figure 2:
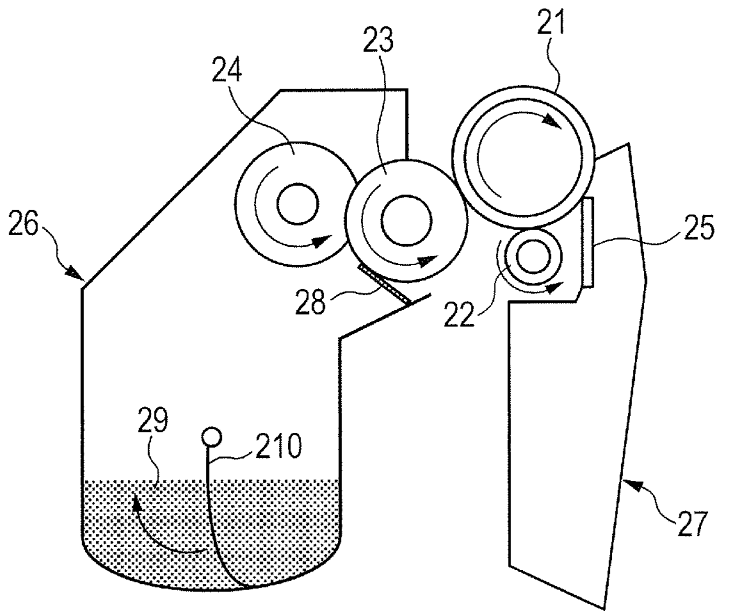
FIG. 2 is an explanatory diagram illustrating an example of a process cartridge according to the present invention.

FIG. 2 is a schematic sectional view of a process cartridge to which the electro-conductive member for electrophotography according to the present invention is applied. The process cartridge is formed of one or more of a developing apparatus and a charging apparatus. The developing apparatus is obtained by integrating at least a developing roller 23, a toner-supplying roller 24, a toner 29, a developing blade 28, a toner container 26, a stirring blade 210, and a waste toner container 27. The charging apparatus is obtained by integrating at least a photosensitive drum 21, a cleaning blade 25, and a charging roller 22. A voltage is applied to each of the charging roller 22, the developing roller 23, the toner-supplying roller 24, and the developing blade 28.

Figure 3:
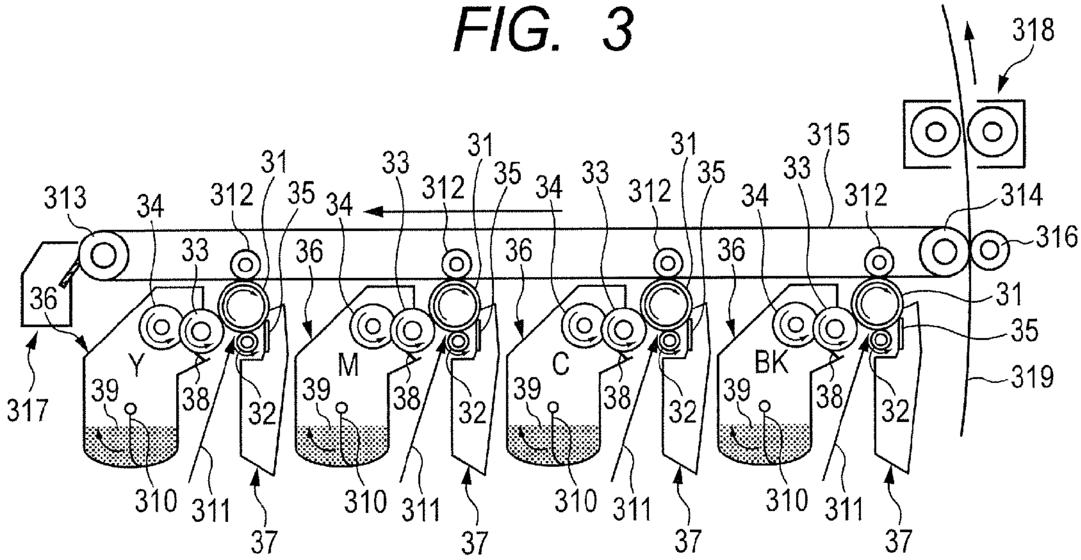
FIG. 3 is an explanatory diagram illustrating an example of an electrophotographic apparatus according to the present invention.

A schematic construction view of FIG. 3 illustrates an electrophotographic image-forming apparatus provided with an example of the charging roller of the present invention. The electrophotographic image-forming apparatus is, for example, the following color image-forming apparatus. The process cartridge illustrated in FIG. 2 is provided for each of toners of respective colors, i.e., black, magenta, yellow, and cyan colors, and the process cartridge is detachably mountable to the apparatus.

The process cartridge is formed of one or more of a developing apparatus and a charging apparatus. The developing apparatus is obtained by integrating at least a developing roller 33, a toner-supplying roller 34, a toner 39, a developing blade 38, a toner container 36, a stirring blade 310, and a waste toner container 37. The charging apparatus is obtained by integrating at least a photosensitive drum 31, a cleaning blade 35, and a charging roller 32. A voltage is applied to each of the charging roller 32, the developing roller 33, the toner-supplying roller 34, and the developing blade 38.

The photosensitive drum 31 rotates in a direction indicated by an arrow and is uniformly charged by the charging roller 32 to which a voltage has been applied from a charging bias power source, and an electrostatic latent image is formed on its surface by exposure light 311. The toner 39 conveyed by the developing roller 33 placed to be in contact with the photosensitive drum 31 is applied to the electrostatic latent image to develop the image, which is visualized as a toner image. The visualized toner image on the photosensitive member is transferred onto an intermediate transfer belt 315 by a primary transfer roller 312 to which a voltage has been applied by a primary transfer bias power source. The toner images of the respective colors are sequentially superimposed to form a color image on the intermediate transfer belt. A transfer material 319 is fed into the apparatus by a sheet-feeding roller, and is then conveyed into a gap between a secondary transfer roller 316 and the intermediate transfer belt 315 backed up by a tension roller 313 and a secondary transfer opposing roller 314. A voltage is applied from a secondary transfer bias power source to the secondary transfer roller 316 through the transfer material 319, and then the roller transfers the color image on the intermediate transfer belt 315 onto the transfer material 319. The transfer material 319 onto which the color image has been transferred is subjected to a fixing treatment by a fixing apparatus 318 and then discharged to the outside of the apparatus. Thus, a printing operation is completed. Meanwhile, the toner remaining on the photosensitive drum without being transferred is scraped off the surface of the photosensitive member by the cleaning blade 35 and stored in the waste toner-storing container 37. The photosensitive drum 31 that has been cleaned repeatedly performs the foregoing process. The toner remaining on the primary transfer belt without being transferred is also scraped off by an intermediate transfer belt cleaner 317.

EXAMPLES

Hereinafter, the present invention is specifically described by way of examples. It should be noted that Example 59 relates to an electro-conductive member illustrated in FIG. 1C in which an elastic layer, an intermediate layer (electro-conductive layer of the present invention), and a surface layer (protective layer) are provided in the stated order on the outer periphery of a mandrel, and Example 65 relates to an electro-conductive member illustrated in FIG. 1A in which the electro-conductive layer of the present invention is provided on the outer periphery of a mandrel. Examples and comparative examples except those described above each relate to an electro-conductive member illustrated in FIG. 1B in which an elastic layer and a surface layer (electro-conductive layer of the present invention) are provided in the stated order on the outer periphery of a mandrel.

Before describing examples, first, 1. preparation of unvulcanized rubber composition, 2. production of elastic roller, 3. preparation of ionic conductive agent, and 4. preparation of coating liquid are described.

<1. Preparation of Unvulcanized Rubber Composition>

An "A-kneading rubber composition 1" was obtained by mixing respective materials whose kinds and amounts were shown in Table 1 below with a pressure kneader. Further, the respective materials whose kinds and amounts were shown in Table 2 below were mixed into 166 parts by mass of the A-kneaded rubber composition 1 with an open roll. Thus, an "unvulcanized rubber composition 1" was prepared.

TABLE 1

| Material | Blending amount (part(s) by mass) |
|---|---|
| NBR (trade name: Nipol DN219, manufactured by ZEON CORPORATION) | 100 |
| Carbon black (trade name: TOKABLACK #7360SB, manufactured by TOKAI CARBON CO., LTD.) | 40 |
| Calcium carbonate (trade name: NANOX #30, manufactured by Maruo Calcium Co., Ltd.) | 20 |
| Zinc oxide | 5 |
| Stearic acid | 1 |

TABLE 2

| Material | Blending amount (part(s) by mass) |
|---|---|
| Sulfur | 1.2 |
| Tetrabenzylthiuram disulfide (trade name: TBZTD, manufactured by SANSHIN CHEMICAL INDUSTRY CO., LTD.) | 4.5 |

<2. Production of Elastic Roller>

Prepared was a columnar rod having a total length of 252 mm and an outer diameter of 6 mm obtained by plating the surface of a carbon steel alloy with nickel having a thickness of about 5 μm through an electroless nickel plating treatment. Next, an adhesive was applied over the entire periphery of a 230-mm range excluding both end portions of the columnar rod each having a length of 11 mm. An electro-conductive, hot-melt type adhesive was used as the adhesive. In addition, a roll coater was used in the application. In this production example, the columnar rod to which the adhesive had been applied was used as an electro-conductive mandrel.

Next, a crosshead extruder having a mechanism for supplying the electro-conductive mandrel and a mechanism for discharging an unvulcanized rubber roller was prepared. A die having an inner diameter of 12.5 mm was attached to a crosshead, the temperatures of the extruder and the crosshead were adjusted to 80° C., and the speed at which the electro-conductive mandrel was conveyed was adjusted to 60 mm/sec. Under the conditions, the unvulcanized rubber composition was supplied from the extruder, and then the electro-conductive mandrel was coated with the unvulcanized rubber composition as an elastic layer in the crosshead to provide an "unvulcanized rubber roller." Next, the unvulcanized rubber roller was loaded into a hot-air vulcanization furnace at 170° C. and heated for 60 minutes to provide a "vulcanized rubber roller." After that, the end portions of the elastic layer were cut and removed. Finally, the surface of the elastic layer was ground with grindstone. Thus, an "elastic roller 1" having a diameter at a position distant from its central portion toward each of both end portions by 90 mm of 8.4 mm and a diameter at the central portion of 8.5 mm was obtained.

<3. Preparation of Ionic Conductive Agent as Raw Material>

<3-1. Preparation of Ionic Conductive Agent a>

8.56 Grams (56.5 mmol) of glycidyl trimethylammonium chloride were dissolved in 50 ml of purified water. Next, 16.22 g (56.5 mmol) of lithium bis(trifluoromethanesulfonyl) imide were dissolved in 50 ml of purified water. Those two kinds of aqueous solutions were mixed and then stirred for 2 hours. After the mixing and stirring, the mixture was left at rest overnight. As a result, the mixture separated into two phases, i.e., an aqueous phase in which lithium chloride as a reaction by-product was dissolved as an upper phase liquid and an oil phase formed of glycidyl trimethylammonium bis(trifluoromethanesulfonylimide) as a lower phase liquid. The oil phase was collected with a separating funnel and then lithium chloride remaining in a small amount in the collected oil phase was removed by repeating the washing of the oil phase with purified water twice. An "ionic conductive agent a" having a glycidyl group as a reactive functional group was produced by such method as described above.

<3-2. Preparation of Ionic Conductive Agent b>

8.56 Grams (56.5 mmol) of glycidyl trimethylammonium chloride were dissolved in 50 ml of purified water. Next, 7.03 g (56.5 mmol) of sodium perchlorate were dissolved in 50 ml of purified water. Those two kinds of aqueous solutions were mixed and then stirred for 2 hours. After the mixing and stirring, the mixture was left at rest overnight. As a result, the mixture separated into two phases, i.e., an aqueous phase in which sodium chloride as a reaction by-product was dissolved as an upper phase liquid and an oil phase formed of glycidyl trimethylammonium perchlorate as a lower phase liquid. The oil phase was collected with a separating funnel and then sodium chloride remaining in a small amount in the collected oil phase was removed by repeating the washing of the oil phase with purified water twice. Thus, glycidyl trimethylammonium perchlorate (ionic conductive agent b) as an ionic conductive agent having a reactive functional group was obtained.

<3-3. Preparation of Ionic Conductive Agent c>

Glycidyl trimethylammonium chloride was dissolved in ml of purified water. Glycidyl trimethylammonium perchlorate (ionic conductive agent c) as an ionic conductive agent having a reactive functional group was obtained as described above.

<3-4. Preparation of Ionic Conductive Agent d>

8.56 Grams (56.5 mmol) of glycidyl trimethylammonium chloride were dissolved in 50 ml of purified water. Next, 33.17 g (56.5 mmol) of lithium bis(nonafluorobutanesulfonyl)imide were dissolved in 50 ml of purified water. Those two kinds of aqueous solutions were mixed and then stirred for 2 hours. After the mixing and stirring, the mixture was left at rest overnight. As a result, the mixture separated into two phases, i.e., an aqueous phase in which lithium chloride as a reaction by-product was dissolved as an upper phase liquid and an oil phase formed of glycidyl trimethylammonium bis(nonafluorobutanesulfonylimide) as a lower phase liquid. The oil phase was collected with a separating funnel and then lithium chloride remaining in a small amount in the collected oil phase was removed by repeating the washing of the oil phase with purified water twice. Thus, a glycidyl trimethylammonium bis(nonafluorobutanesulfonylimide) (ionic conductive agent d) as an ionic conductive agent having a reactive functional group was obtained.

<3-5. Preparation of Ionic Conductive Agent e>

7.90 Grams (56.5 mmol) of choline chloride were dissolved in 50 ml of methanol. Next, 16.22 g (56.5 mmol) of lithium bis(trifluoromethanesulfonyl)imide were dissolved in 50 ml of methanol. The two kinds of solutions obtained in the foregoing were mixed and then stirred for 2 hours. After the mixing and stirring, the solvent was removed by distillation under reduced pressure. The remainder was extracted with 50 ml of methyl ethyl ketone and filtered, and then the solvent of the filtrate was removed by distillation under reduced pressure. The foregoing operation was repeated again. Thus, choline bis(trifluoromethanesulfonylimide) (ionic conductive agent e) as an ionic conductive agent having a reactive functional group was obtained.

<3-6. Preparation of Ionic Conductive Agent f>

7.07 Grams (56.5 mmol) of taurine were dissolved in ml of purified water. Next, 2.26 g (56.5 mmol) of sodium hydroxide were dissolved in 50 ml of purified water. Those two kinds of aqueous solutions were mixed and then stirred for 2 hours. After the mixing and stirring, water was removed from the resultant aqueous solution by distillation under reduced pressure to precipitate taurine sodium. Thus, taurine sodium (ionic conductive agent f) as an ionic conductive agent having a reactive functional group was obtained.

<3-7. Preparation of Ionic Conductive Agent g>

2.45 Grams (14 mmol) of 1-butyl-3-methylimidazolium chloride were dissolved in 50 ml of anhydrous ethanol. 2.05 Grams (14 mmol) of taurine sodium salt were added to the stirred solution and then the solution was stirred overnight. After the stirring, the solution was filtered. The solvent was removed from the resultant filtrate by distillation under reduced pressure. Thus, taurine (1-butyl-3-methylimidazolium chloride) (ionic conductive agent g) as an ionic conductive agent having a reactive functional group was obtained.

<3-8. Preparation of Ionic Conductive Agent h>

2.07 Grams (14 mmol) of sodium isethionate were dissolved in 50 ml of anhydrous ethanol. 2.05 Grams (14 mmol) of taurine sodium salt were added to the stirred solution and then the solution was stirred overnight. After the stirring, the solution was filtered. The solvent was removed from the resultant filtrate by distillation under reduced pressure. Thus, (1-butyl-3-methylimidazolium)isethionate (ionic conductive agent h) as an ionic conductive agent having a reactive functional group was obtained.

<4. Preparation of Coating Liquid>

<4-1. Preparation of Coating Liquid 1>

Materials shown in Table 3 below were dissolved in methyl ethyl ketone. 5 Mass % of 1-benzyl-2-methylimidazole (trade name: Curezol 1B2MZ, manufactured by SHIKOKU CHEMICALS CORPORATION) with respect to the total amount of the solid content shown in Table 3 below was added as a curing accelerator to the solution. Further, methyl ethyl ketone was added to adjust the concentration of the solid content shown in Table 3 below to 27 mass %. Thus, a "coating liquid 1" was obtained. The amount of ethylene oxide in the solid content of the coating liquid 1 was 0 mass % and the amount of $CF_2$ therein was 26.7 mass %.

TABLE 3

| Material | Blending amount |
|---|---|
| Ionic conductive agent a | 0.32 g |
| Raw material for fluorine-containing resin; 2,2,3,3,4,4,5,5,6,6,7,7,8,8,9,9-hexadecafluoro-1,10-decanediol (manufactured by Sigma-Aldrich) (mass-average molecular weight: 462) | 9.89 g (21.4 mmol) |
| Raw material for alkylene oxide-containing resin; decabutylene glycol diglycidyl ether (mass-average molecular weight: 850) | 21.83 g (25.68 mmol) |

<4-2. Preparation of Coating Liquids 2 to 33>

Coating liquids 2 to 33 were prepared in the same manner as in the coating liquid 1 except that coating liquid materials and their blending amounts were changed as shown in Table 4-1 to Table 4-4. It should be noted that "symbols" shown in the items "raw material for fluorine-containing resin," "raw material for alkylene oxide-containing resin (free of EO)," "raw material for ethylene oxide-containing resin," and "raw material for alkylene oxide-free resin" in Table 4-1 to Table 4-4 each represent a material shown in any one of Table 5-1 to Table 5-4 below.

TABLE 4-1

| | Coating liquid 1 | Coating liquid 2 | Coating liquid 3 | Coating liquid 4 | Coating liquid 5 | Coating liquid 6 | Coating liquid 7 | Coating liquid 8 | Coating liquid 9 | Coating liquid 10 |
|---|---|---|---|---|---|---|---|---|---|---|
| Raw material for fluorine-containing resin | A | A | A | A | A | A | A | A | A | A |
| Molecular weight | 462 | 462 | 462 | 462 | 462 | 462 | 462 | 462 | 462 | 462 |
| Number of moles (mmol) | 21.4 | 21.4 | 21.4 | 21.4 | 21.4 | 21.4 | 21.4 | 21.4 | 10.1 | 21.4 |
| Usage (g) | 9.89 | 9.89 | 9.89 | 9.89 | 9.89 | 9.89 | 9.89 | 9.89 | 4.67 | 9.89 |
| Raw material for alkylene oxide-containing resin (free of EO) | G | G | G | H | I | J | G | H | — | G |
| Molecular weight | 850 | 850 | 850 | 202 | 960 | 380 | 850 | 202 | — | 850 |
| Number of moles (mmol) | 25.68 | 25.68 | 25.68 | 25.68 | 25.68 | 25.68 | 5.08 | 8.68 | — | 3.80 |
| Usage (g) | 21.83 | 21.83 | 21.83 | 5.19 | 24.65 | 9.76 | 4.32 | 1.76 | — | 3.23 |
| Raw material for ethylene oxide-containing resin | — | — | — | — | — | — | K | K | K | M |
| Molecular weight | — | — | — | — | — | — | 174 | 174 | 174 | 262 |
| Number of moles (mmol) | — | — | — | — | — | — | 20.6 | 17 | 25.68 | 21.88 |
| Usage (g) | — | — | — | — | — | — | 3.58 | 2.96 | 4.47 | 5.73 |
| Raw material for alkylene oxide-free resin | — | — | — | — | — | — | — | — | L | — |
| Molecular weight | — | — | — | — | — | — | — | — | 174 | — |
| Number of moles (mmol) | — | — | — | — | — | — | — | — | 11.30 | — |
| Usage (g) | — | — | — | — | — | — | — | — | 1.97 | — |

TABLE 4-1-continued

| | Coating liquid 1 | Coating liquid 2 | Coating liquid 3 | Coating liquid 4 | Coating liquid 5 | Coating liquid 6 | Coating liquid 7 | Coating liquid 8 | Coating liquid 9 | Coating liquid 10 |
|---|---|---|---|---|---|---|---|---|---|---|
| Kind of ionic conductive agent | a | a | a | a | a | a | a | a | a | a |
| Usage (g) | 0.32 | 0.63 | 2.54 | 0.30 | 0.69 | 0.39 | 0.36 | 0.29 | 0.22 | 0.38 |
| EO ratio (wt %) | 0 | 0 | 0 | 0 | 0 | 0 | 10 | 10 | 20 | 20 |
| $CF_2$ ratio (wt %) | 26.7 | 26.5 | 25.0 | 55.6 | 24.3 | 42.7 | 47.2 | 57.5 | 35.7 | 44.5 |

TABLE 4-2

| | Coating liquid 11 | Coating liquid 12 | Coating liquid 13 | Coating liquid 14 | Coating liquid 15 | Coating liquid 16 | Coating liquid 17 | Coating liquid 18 | Coating liquid 19 | Coating liquid 20 |
|---|---|---|---|---|---|---|---|---|---|---|
| Raw material for fluorine-containing resin | A | A | A | A | A | A | A | A | A | A |
| Molecular weight | 462 | 462 | 462 | 462 | 462 | 462 | 462 | 462 | 462 | 462 |
| Number of moles (mmol) | 21.4 | 14.9 | 21.4 | 21.4 | 2.2 | 21.4 | 21.4 | 21.4 | 21.4 | 21.4 |
| Usage (g) | 9.89 | 6.89 | 9.89 | 9.89 | 1.02 | 9.89 | 9.89 | 9.89 | 9.89 | 9.89 |
| Raw material for alkylene oxide-containing resin (free of EO) | H | — | G | H | — | G | H | — | G | H |
| Molecular weight | 202 | — | 850 | 202 | — | 850 | 202 | — | 850 | 202 |
| Number of moles (mmol) | 6.90 | — | 6.60 | 10.80 | — | 11.48 | 16.15 | — | 6.00 | 10.00 |
| Usage (g) | 1.40 | — | 5.61 | 2.18 | — | 9.76 | 3.27 | — | 5.10 | 2.02 |
| Raw material for ethylene oxide-containing resin 1 | M | M | N | N | M | O | O | N | N | N |
| Molecular weight | 262 | 262 | 482 | 482 | 262 | 1,098 | 1,098 | 482 | 482 | 482 |
| Number of moles (mmol) | 18.78 | 25.68 | 19.08 | 14.88 | 25.68 | 14.20 | 9.53 | 21.75 | 4.18 | 3.38 |
| Usage (g) | 4.92 | 6.73 | 9.20 | 7.17 | 6.73 | 15.59 | 10.46 | 10.48 | 2.01 | 1.63 |
| Raw material for ethylene oxide-containing resin 2 | — | — | — | — | — | — | — | O | O | C |
| Molecular weight | — | — | — | — | — | — | — | 1,098 | 1,098 | 1,098 |
| Number of moles (mmol) | — | — | — | — | — | — | — | 3.93 | 15.5 | 12.3 |
| Usage (g) | — | — | — | — | — | — | — | 4.32 | 17.02 | 13.51 |
| Raw material for alkylene oxide-free resin | — | L | — | — | L | — | — | — | — | — |
| Molecular weight | — | 174 | — | — | 174 | — | — | — | — | — |
| Number of moles (mmol) | — | 6.5 | — | — | 19.2 | — | — | — | — | — |
| Usage (g) | — | 1.13 | — | — | 3.35 | — | — | — | — | — |
| Kind of ionic conductive agent | a | a | a | a | a | a | a | a | a | a |
| Usage (g) | 0.32 | 0.29 | 0.49 | 0.38 | 0.22 | 0.70 | 0.47 | 0.49 | 0.68 | 0.54 |
| EO ratio (wt %) | 20 | 30 | 30 | 30 | 40 | 40 | 40 | 50 | 50 | 50 |
| $CF_2$ ratio (wt %) | 51.8 | 39.6 | 34.0 | 43.6 | 7.8 | 23.8 | 35.5 | 34.0 | 24.7 | 31.0 |

TABLE 4-3

| | Coating liquid 21 | Coating liquid 22 | Coating liquid 23 | Coating liquid 24 | Coating liquid 25 | Coating liquid 26 | Coating liquid 27 | Coating liquid 28 | Coating liquid 29 | Coating liquid 30 |
|---|---|---|---|---|---|---|---|---|---|---|
| Raw material for fluorine-containing resin | A | A | A | B | B | B | B | B | B | C |
| Molecular weight | 462 | 462 | 462 | 162 | 162 | 162 | 162 | 162 | 162 | 1,000 |
| Number of moles (mmol) | 21.4 | 21.4 | 21.4 | 21.4 | 21.4 | 21.4 | 21.4 | 21.4 | 21.4 | 21.4 |
| Usage (g) | 9.89 | 9.89 | 9.89 | 3.47 | 3.47 | 3.47 | 3.47 | 3.47 | 3.47 | 21.40 |
| Raw material for alkylene oxide-containing resin (free of EO) | — | G | H | G | H | G | H | G | H | G |
| Molecular weight | — | 850 | 202 | 850 | 202 | 850 | 202 | 850 | 202 | 850 |
| Number of moles (mmol) | — | 0.85 | 1.80 | 25.68 | 25.68 | 2.85 | 6.80 | 0.86 | 2.40 | 25.68 |
| Usage (g) | — | 0.72 | 0.36 | 21.83 | 5.19 | 2.42 | 1.38 | 0.73 | 0.49 | 21.83 |
| Raw material for ethylene oxide-containing resin 1 | N | O | O | — | — | K | K | M | N | — |
| Molecular weight | 482 | 1,098 | 1,098 | — | — | 174 | 174 | 262 | 262 | — |
| Number of moles (mmol) | 3.5 | 24.83 | 23.88 | — | — | 22.83 | 18.88 | 24.82 | 23.28 | — |
| Usage (g) | 1.69 | 27.26 | 26.22 | — | — | 3.97 | 3.29 | 6.50 | 6.10 | — |

TABLE 4-3-continued

| | Coating liquid 21 | Coating liquid 22 | Coating liquid 23 | Coating liquid 24 | Coating liquid 25 | Coating liquid 26 | Coating liquid 27 | Coating liquid 28 | Coating liquid 29 | Coating liquid 30 |
|---|---|---|---|---|---|---|---|---|---|---|
| Raw material for ethylene oxide-containing resin 2 | O | — | — | — | — | — | — | — | — | — |
| Molecular weight | 1,098 | — | — | — | — | — | — | — | — | — |
| Number of moles (mmol) | 22.18 | — | — | — | — | — | — | — | — | — |
| Usage (g) | 24.35 | — | — | — | — | — | — | — | — | — |
| Kind of ionic conductive agent | a | a | a | a | a | a | a | a | a | a |
| Usage (g) | 0.72 | 0.76 | 0.73 | 0.51 | 0.17 | 0.20 | 0.16 | 0.21 | 0.20 | 0.86 |
| EO ratio (wt %) | 65 | 65 | 65 | 0 | 0 | 20 | 20 | 40 | 40 | 0 |
| $CF_2$ ratio (wt %) | 23.4 | 22.2 | 23.0 | 8.3 | 24.2 | 21.3 | 25.8 | 19.6 | 20.9 | 53.4 |

TABLE 4-4

| | Coating liquid 31 | Coating liquid 32 | Coating liquid 33 |
|---|---|---|---|
| Raw material for fluorine-containing resin | C | C | C |
| Molecular weight | 1,000 | 1,000 | 1,000 |
| Number of moles (mmol) | 21.4 | 21.4 | 21.4 |
| Usage (g) | 21.40 | 21.40 | 21.40 |
| Raw material for alkylene oxide-containing resin (free of EO) | H | G | H |
| Molecular weight | 202.25 | 850 | 202 |
| Number of moles (mmol) | 25.68 | 6.30 | 8.90 |
| Usage (g) | 5.19378 | 5.36 | 1.80 |
| Raw material for ethylene oxide-containing resin | — | O | O |
| Molecular weight | — | 1,098 | 1,098 |
| Number of moles (mmol) | — | 19.38 | 16.78 |
| Usage (g) | — | 21.28 | 18.42 |
| Kind of ionic conductive agent | a | a | a |
| Usage (g) | 0.53 | 0.96 | 0.83 |
| EO ratio (wt %) | 0 | 40 | 40 |
| $CF_2$ ratio (wt %) | 86.8 | 48.0 | 55.4 |

TABLE 5-1

| Symbol | Raw material for fluorine-containing resin |
|---|---|
| A | 2,2,3,3,4,4,5,5,6,6,7,7,8,8,9,9-Hexadecafluoro-1,10-decanediol |
| B | 2,2,3,3-Tetrafluoro-1,4-butanediol |
| C | Perfluoropolyether diol |

TABLE 5-2

| Symbol | Raw material for alkylene oxide-containing resin (free of EO) |
|---|---|
| G | Decabutylene glycol diglycidyl ether |
| H | Butylene glycol diglycidyl ether |
| I | Undecapropylene glycol diglycidyl ether |
| J | Propylene glycol diglycidyl ether |

TABLE 5-3

| Symbol | Raw material for ethylene oxide-containing resin |
|---|---|
| K | Ethylene glycol diglycidyl ether |
| M | Tetraethylene glycol diglycidyl ether |

TABLE 5-3-continued

| Symbol | Raw material for ethylene oxide-containing resin |
|---|---|
| N | Nonaethylene glycol diglycidyl ether |
| O | Tricosaethylene glycol diglycidyl ether |

TABLE 5-4

| Symbol | Raw material for alkylene oxide-free resin |
|---|---|
| L | 1,10-Decanediol |

<4-3. Preparation of Coating Liquid 34>

16.4 Grams (16.4 mmol) of a perfluoropolyether diol (trade name: Fuluorolink D10H, manufactured by Solvay Solexis) (having a mass-average molecular weight of 1,000) as a raw material for a fluorine-containing resin, 4.25 g (5.00 mmol) of a polytetramethylene glycol (trade name; PTMG850, manufactured by Mitsubishi Chemical Corporation) (having a mass-average molecular weight of 850) as a raw material for an alkylene oxide-containing resin, 24.71 g of a polymeric MDI (trade name: MILLIONATE MR-200, manufactured by Nippon Polyurethane Industry Co., Ltd.), and 0.49 g of the ionic conductive agent e having a reactive functional group were dissolved in methyl ethyl ketone, and then the solid content of the solution was adjusted to 35 mass %.

Thus, a coating liquid 34 was obtained. The amount of ethylene oxide in the solid content of the coating liquid 34 was 0 mass % and the amount of $CF_2$ therein was 71.58 mass %.

<4-4. Preparation of Coating Liquid 35 to Coating Liquid 39>

A coating liquid 35 to a coating liquid 39 were each prepared in the same manner as in the coating liquid 34 except that coating liquid materials and their blending amounts were changed as shown in Table 6. It should be noted that "symbols" shown in the items "raw material for alkylene oxide-containing resin (free of EO)," "raw material for ethylene oxide-containing resin," and "raw material for alkylene oxide-free resin" in Table 6 each represent a material shown in any one of Table 7-1 to Table 7-3 below. Further, in Table 6, the "symbol" shown in the item "raw material for fluorine-containing resin" represents the material shown in Table 5-1 above.

TABLE 6

| | Coating liquid 34 | Coating liquid 35 | Coating liquid 36 | Coating liquid 37 | Coating liquid 38 | Coating liquid 39 |
|---|---|---|---|---|---|---|
| Raw material for fluorine-containing resin | C | C | C | C | C | C |
| Molecular weight | 1,000 | 1,000 | 1,000 | 1,000 | 1,000 | 1,000 |
| Number of moles (mmol) | 16.4 | 21.4 | 21.4 | 21.4 | 13.1 | 9.3 |
| Usage (g) | 16.40 | 21.40 | 21.40 | 21.40 | 13.09 | 9.29 |
| Raw material for alkylene oxide-containing resin (free of EO) | P | Q | R | P | — | P |
| Molecular weight | 850 | 650 | 425 | 850 | — | 850 |
| Number of moles (mmol) | 5 | 5.00 | 5.00 | 5.00 | — | 4.00 |
| Usage (g) | 4.25 | 3.25 | 2.12 | 4.25 | — | 3.40 |
| Raw material for ethylene oxide-containing resin | — | — | — | — | S | S |
| Molecular weight | — | — | — | — | 200 | 200 |
| Number of moles (mmol) | — | — | — | — | 8.31 | 8.11 |
| Usage (g) | — | — | — | — | 1.66 | 1.62 |
| Raw material for alkylene oxide-free resin | W | W | W | W | W | W |
| Molecular weight | 135.4839 | 135.48 | 135.48 | 135.48 | 135.48 | 135.48 |
| Number of moles (mmol) | 29.96 | 29.96 | 29.96 | 29.96 | 29.96 | 29.96 |
| Usage (g) | 4.059097 | 4.06 | 4.06 | 4.06 | 4.06 | 4.06 |
| Kind of ionic conductive agent | e | e | e | e | e | e |
| Usage (g) | 0.49 | 0.57 | 0.55 | 0.59 | 0.38 | 0.37 |
| EO ratio (wt %) | 0 | 0 | 0 | 0 | 40 | 40 |
| $CF_2$ ratio (wt %) | 71.6 | 80.4 | 83.7 | 77.7 | 75.0 | 54.5 |

TABLE 7-1

| Symbol | Raw material for alkylene oxide-containing resin (free of ethylene oxide) |
|---|---|
| P | Polytetramethylene glycol (PTMG850) |
| Q | Polytetramethylene glycol (PTMG650) |
| R | Polypropylene glycol |

TABLE 7-2

| Symbol | Raw material for ethylene oxide-containing resin |
|---|---|
| S | Polyethylene glycol |

TABLE 7-3

| Symbol | Raw material for alkylene oxide-free resin |
|---|---|
| W | Polymeric MDI (MILLIONATE MR-200) |

Example 1

<1. Production of Conductive Roller 1>

The elastic roller 1 was coated with the coating liquid 1 by a dipping method involving immersing the roller in the liquid with its longitudinal direction defined as a vertical direction. An immersion time was set to 9 seconds, an initial lifting speed was set to 20 mm/s, a final lifting speed was set to 2 mm/s, and a speed was linearly changed with time between the initial and final speeds. The resultant coated product was air-dried at 23° C. for 30 minutes or more. Next, the product was dried with a hot air-circulating dryer set to 90° C. for 1 hour. Further, the product was dried with a hot air-circulating dryer set to 160° C. for 3 hours. Thus, an electro-conductive layer was formed on the outer peripheral surface of the elastic roller. As a result, a "electro-conductive roller 1" having a diameter at its central portion of 8.5 mm was obtained.

<2. Characteristic Evaluation>

Next, the electro-conductive roller 1 was subjected to the following respective evaluation tests. Table 8-1 shows the results of the evaluations. It should be noted that TFSI in Table 8-1 represents trifluoromethanesulfonylimide.

(Evaluation 1: Measurement of Resistivity of Electro-Conductive Layer)

The electrical resistivity of the ionic conductive layer was calculated by performing alternating-current impedance measurement according to a four-probe method. The measurement was performed at a voltage amplitude of 5 mV in the frequency range of 1 Hz to 1 MHz. It should be noted that when an electro-conductive roller in any one of the examples and comparative examples to be described later had multiple electro-conductive layers, an electro-conductive layer placed outside the electro-conductive layer according to the present invention was peeled and then the electrical resistivity of the electro-conductive layer according to the present invention was measured.

The electrical resistivity was measured under each of the L/L environment (having a temperature of 15° C. and a relative humidity of 10%) and the H/H environment (having a temperature of 30° C. and a relative humidity of 80%). In addition, in order for the influence of an environmental variation to be confirmed, the logarithm of a ratio (R1/R2) of an electrical resistivity R1 under the L/L environment to an electrical resistivity R2 under the H/H environment was determined and defined as an "environmental variation digit." It should be noted that in this example, the electro-conductive roller 1 was left to stand under each environment for 48 hours or more before the evaluation.

(Evaluation 2: Bleeding Test)

Next, such a bleeding test as described below was performed for confirming the presence or absence of bleeding when the electro-conductive roller was used for a long time period.

The bleeding test was performed with a process cartridge for an electrophotographic laser printer (trade name: HP Color Laserjet Enterprise CP4525dn, manufactured by Hewlett-Packard Company). The process cartridge was disassembled and then the electro-conductive roller 1 was incorporated as a charging roller. The process cartridge was left to stand under an environment having a temperature of 40° C. and a relative humidity of 95% for 2 days in a state where the charging roller was brought into abutment with a photosensitive drum. After that, the surface of the photosensitive drum was observed with an optical microscope (at a magnification of 10), the presence or absence of the adhesion of a product bleeding from the charging roller and the presence or absence of a crack in the surface of the photosensitive drum were observed, and an evaluation was performed based on the following criteria.

A: No adhesion of any bleeding product on the surface of the abutting portion of the photosensitive drum is observed.

B: The adhesion of a slight bleeding product on the part of the surface of the abutting portion of the photosensitive drum is observed.

C: The adhesion of a slight bleeding product on the entire surface of the abutting portion of the photosensitive drum is observed.

D: The adhesion of a bleeding product on the surface of the abutting portion of the photosensitive drum is observed and the occurrence of a crack is observed.

<3. Image Evaluation>

The electro-conductive roller was subjected as a charging roller to the following respective evaluation tests. Table 8-1 shows the results of the evaluations.

(Evaluation 3: Pinhole Leak Test)

Such an evaluation as described below was performed for confirming a suppressing effect on a pinhole leak when the conductive roller was used at high temperature and high humidity.

First, the conductive roller was left to stand under the H/H environment for 48 hours or more. Next, an electrophotographic laser printer (trade name: HP Color Laserjet Enterprise CP4525dn, manufactured by Hewlett-Packard Company) was prepared as an electrophotographic apparatus and was reconstructed in terms of the number of sheets to be output so that 50 sheets of A4-size paper were output per minute. That is, the speed at which the A4-size paper was output was set to 300 mm/sec. It should be noted that an image resolution was set to 1,200 dpi.

Next, a photosensitive drum was taken out of a process cartridge of the electrophotographic apparatus, and then only a photosensitive layer on the surface of the photosensitive drum was perforated with a pinhole having a diameter of 0.3 mm in a direction perpendicular to the surface.

The electro-conductive roller was used as a charging roller and the photosensitive drum having the pinhole was incorporated into the process cartridge of the electrophotographic apparatus. Further, an external power source (trade name: Trek 615-3, manufactured by Trek) was prepared and then an image evaluation was performed by applying a direct-current voltage of −1,500 V to the charging roller. The entire image evaluation was performed under the H/H environment, and was performed by outputting five halftone images (images in each of which horizontal lines each having a width of 1 dot were drawn in a direction perpendicular to the rotation direction of the photosensitive member at an interval of 2 dots). At this time, the case where an image density along a line horizontal to the image output direction from the position of the pinhole on the photosensitive drum significantly differed from that around the line was judged to be the case where an image failure called a "pinhole leak" occurred. The resultant images were evaluated by the following criteria.

A: No pinhole leak is observed in each of the five images.

B: One to three pinhole leaks occur in each of the five images.

C: Pinhole leaks occur in each of the five images in synchronization with the cycle of the photosensitive drum.

(Evaluation 4: Evaluation for Horizontal Streak-Like Image Defect)

Such an evaluation as described below was performed for confirming a suppressing effect on a fluctuation in electrical resistivity when the electro-conductive roller 1 was used for a long time period and a reducing effect on the electrical resistivity under the low-temperature, low-humidity environment.

(1) Direct Current-Passing Treatment

Figure 4A:
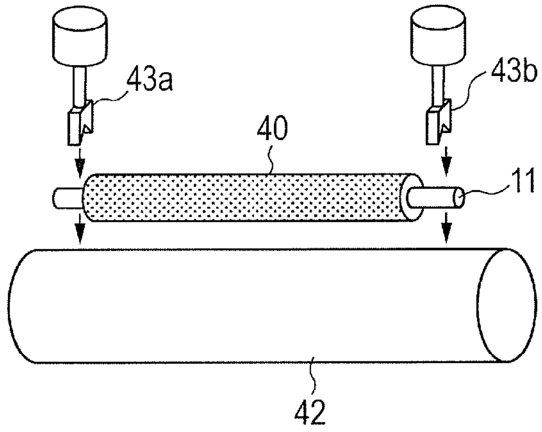
FIG. 4A is a schematic construction view illustrating an example of a jig for evaluating a change in resistance caused by the passage of a direct current.
Figure 4B:
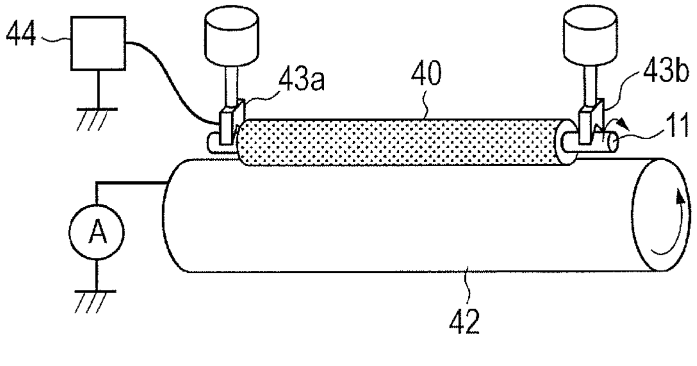
FIG. 4B is a schematic construction view illustrating an example of the jig for evaluating a change in resistance caused by the passage of a direct current.

A fluctuation in resistance when a direct current was passed through the electro-conductive roller 1 was observed. A jig illustrated in each of FIGS. 4A and 4B was used for the evaluation. An evaluation method involving using the jig illustrated in each of FIGS. 4A and 4B is described. In each of FIGS. 4A and 4B, a load (500 gf on each side) is applied to each of both ends of an electro-conductive support 11 of an electro-conductive roller 40 as an object to be measured to bring the roller into abutment with a columnar metal 42 having a diameter of 24 mm, thereby passing a direct current through the roller, followed by the measurement of the change of its electrical resistivity due to the passage of the direct current. In FIG. 4A, reference symbols 43*a* and 43*b* each represent a bearing fixed to a deadweight, and the columnar metal 42 is positioned vertically downward the electro-conductive roller so as to be parallel to the electro-conductive roller.

The electro-conductive roller as an object to be measured is left to stand under the L/L environment for 48 hours. Next, under the L/L environment, the electro-conductive roller 40 is pressed against the columnar metal 42 as illustrated in FIG. 4B while the columnar metal 42 is rotated at the same rotational speed (30 rpm) as that of a photosensitive drum in use by a driving apparatus (not shown). Then, a direct current of 200 μA is passed through the electro-conductive roller by a power source 44 for 30 minutes. After that, an electrophotographic image is formed with the electro-conductive roller.

(2) Image Evaluation

Prepared as an electrophotographic apparatus was an electrophotographic laser printer (trade name: Laserjet CP4525dn, manufactured by Hewlett-Packard Company) reconstructed so as to output A4-size paper at a high speed, specifically, 50 sheets/min. At that time, the speed at which a recording medium was output was set to 300 mm/sec and an image resolution was set to 1,200 dpi. The electro-conductive roller was incorporated as a charging roller into a cartridge of the electrophotographic apparatus and then an image evaluation was performed. The entire image evaluation was performed under the L/L environment, and was performed by outputting a halftone image (image in which horizontal lines each having a width of 1 dot were drawn in a direction perpendicular to the rotation direction of a photosensitive member at an interval of 2 dots). The resultant image was visually observed and evaluated by the following criteria.

A: No horizontal streak-like image is present.

B: A slight, horizontal streak-like white line is observed in part of the image.

C: A slight, horizontal streak-like white line is observed in the entire surface of the image.

D: A grave, horizontal streak-like white line is observed and conspicuous.

(Evaluation 5: Evaluation for Contamination of Surface of Roller)

The following evaluation was performed for confirming a suppressing effect on surface contamination when the electro-conductive roller was used for a long time period.

An image evaluation was performed by attaching the electro-conductive roller to the following electrophotographic apparatus. Prepared as the electrophotographic apparatus was a laser printer (trade name: HP Color Laserjet Enterprise CP4525dn, manufactured by Hewlett-Packard Company) reconstructed so as to output A4-size paper at a high speed, specifically, 50 sheets/min. At that time, the speed at which a recording medium was output was set to 300 mm/sec and an image resolution was set to 1,200 dpi. The electro-conductive roller was incorporated as a charging roller into a process cartridge of the electrophotographic apparatus and then the image evaluation was performed.

An endurance test was performed with the electrophotographic apparatus under an environment having a temperature of 23° C. and a relative humidity of 50%. In the endurance test, 40,000 electrophotographic images are output by repeating the following intermittent image-forming operation. Two images are output, the rotation of a photosensitive drum is completely stopped for about 3 seconds after the output, and image output is restarted. An image to be output at this time was such an image that an alphabetical letter "E" having a size of 4 points was printed so as to have a coverage of 4% with respect to the area of A4-size paper.

After the endurance test, the process cartridge was disassembled, and then the electro-conductive roller was taken out and left to stand under the L/L environment for 48 hours or more. Next, the electro-conductive roller was incorporated as a charging roller into the process cartridge again and then an image evaluation was performed. The entire image evaluation was performed under the L/L environment, and was performed by outputting a halftone image (image in which horizontal lines each having a width of 1 dot were drawn in a direction perpendicular to the rotation direction of the photosensitive member at an interval of 2 dots). With regard to an image, a streak-like image or spot-like image caused by the adhesion of foreign matter was evaluated by the following criteria.

A: No streak-like image or spot-like image is observed.

B: A streak or a black spot can be observed in a region having a width of 2 cm at each of both ends of paper.

C: A streak or a black spot image can be observed in a region having a width of more than 2 cm and up to 5 cm at each of both ends of paper.

D: A streak or a black spot can be observed in the entire paper surface.

(Evaluation 6: Measurement of Discharge Current Amount Needed for Disappearance of Image Defect)

Such an evaluation as described below was performed for confirming a suppressing effect on a discharge current amount under the high-temperature, high-humidity environment when the electro-conductive roller was used in the AC/DC charging system.

An electrophotographic laser printer based on the AC/DC charging system (trade name: Laserjet 4515n, manufactured by Hewlett-Packard Company) was prepared as an electrophotographic apparatus. It should be noted that the speed at which the laser printer outputs a recording medium is 370 mm/sec and its image resolution is 1,200 dpi. In addition, a charging roller-holding member in a process cartridge of the electrophotographic apparatus was replaced with a reconstructed holding member longer than the holding member by 3.5 mm so that the electro-conductive roller having an outer diameter of 8.5 mm could be incorporated.

In the measurement of a discharge current amount, the laser printer was reconstructed, an earth current flowing from a photosensitive drum to the earth was measured, and the discharge current amount was calculated from the earth current. A method for the foregoing is described below. First, conduction from the photosensitive drum to the main body of the laser printer was blocked, the photosensitive drum and a metal thin-film resistor (1 kΩ) outside the laser printer were connected in series with a lead, and the metal thin-film resistor was connected to the earth of the laser printer. Next, a DC voltage and an AC voltage were applied to the electro-conductive roller while being superimposed, and a true effective value for the waveform of a voltage across the metal thin-film resistor that was able to be measured with a digital multimeter (trade name: FLUKE 87V, manufactured by FLUKE) was defined as an earth current amount.

When the earth current amount is plotted against the AC voltage (Vpp), an AC current flows through a nip portion as a portion of contact between the charging roller and the photosensitive drum at low Vpp, and hence the earth current amount linearly increases. When the Vpp increases and discharge is caused by an AC voltage component, the earth current is measured in a state where a discharge current is superimposed thereon. Therefore, the plot of the earth current increases from the linear plot in the low-Vpp region by the amount of the discharge current. That is, the discharge current amount can be plotted against the Vpp by subtracting a straight line obtained by extending the graph of the plot in the low-Vpp region toward high Vpp from the plot of the earth current.

First, the electro-conductive roller 1 was left to stand under the H/H environment for 48 hours or more. The electro-conductive roller was incorporated as a charging roller into a process cartridge of the electrophotographic apparatus. The process cartridge was mounted on the electrophotographic apparatus and then an electrophotographic image was formed. First, an entirely white image was output by applying a DC voltage of −600 V and an AC voltage of 900 Vpp (having a frequency of 2,931 Hz) to the charging roller under the H/H environment, and then the presence or absence of a spot-like black dot was confirmed. Next, when the spot-like black dot occurred, the entirely white image was output again by increasing the AC voltage by 10 V, and then the presence or absence of a spot-like black dot was similarly confirmed. The foregoing operation was repeated until an electrophotographic image in which no spot-like black dot occurred was obtained. Then, an applied AC voltage when the electrophotographic image in which the occurrence of a spot-like black dot was not observed was obtained was defined as an image defect-disappearing voltage. In addition, a discharge current amount calculated from an earth current under such a condition that the image defect-disappearing voltage was applied was defined as an image defect-disappearing discharge current amount.

Example 2

An electro-conductive roller 2 was produced in the same manner as in Example 1 except that the coating liquid 2 was used instead of the coating liquid 1, and then the roller was evaluated as a charging roller. Table 8-1 shows the results of the evaluations.

Example 3 and Example 4

An electro-conductive roller 3 or 4 was produced in the same manner as in Example 2 except that the coating liquid 2 was used and the thickness of the ionic conductive layer was changed, and then the roller was evaluated as a charging roller. Table 8-1 shows the results of the evaluations.

Example 5

An electro-conductive roller 5 was produced in the same manner as in Example 2 except that the usage of the carbon black as a raw material for the "kneading rubber composition" was changed to 50 parts by mass, and then the roller was evaluated as a charging roller. Table 8-1 shows the results of the evaluations.

Example 6

An electro-conductive roller 6 was produced in the same manner as in Example 2 except that the usage of the carbon black as a raw material for the "kneading rubber composition" was changed to 20 parts by mass, and then the roller was evaluated as a charging roller. Table 8-1 shows the results of the evaluations.

Examples 7 to 37

Electro-conductive rollers 7 to 37 were each produced in the same manner as in Example 1 except that the coating liquid 3 to the coating liquid 33 were each used instead of the coating liquid 1, and then the rollers were evaluated as charging rollers. Table 8-1 to Table 8-4 show the results of the evaluations. It should be noted that TFSI in Table 8-1 represents trifluoromethanesulfonylimide.

Examples 38 to 43

Electro-conductive rollers 38 to 43 were each produced in the same manner as in Example 1 except that the coating liquid 34 to the coating liquid 39 were each used as a raw material for the ionic conductive layer, and then the rollers were evaluated as charging rollers. Table 8-4 and Table 8-5 show the results of the evaluations.

TABLE 8-1

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Electro-conductive elastic roller No. | 1 | 2 | 3 | 4 | 5 | 6 | 7 | 8 | 9 | 10 |
| Kind of resin of elastic layer | NBR rubber | NBR rubber | NBR rubber | NBR rubber | NBR rubber | NBR rubber | NBR rubber | NBR rubber | NBR rubber | NBR rubber |
| Sheet resistance (Ω · cm) (under low-temperature, low-humidity environment) | 3.50E+05 | 3.50E+05 | 3.50E+05 | 3.50E+05 | 9.20E+04 | 8.50E+05 | 3.50E+05 | 3.50E+05 | 3.50E+05 | 3.50E+05 |
| Sheet resistance (Ω · cm) (under high-temperature, high-humidity environment) | 4.94E+06 | 4.94E+06 | 4.94E+06 | 4.94E+06 | 1.30E+06 | 1.20E+07 | 4.94E+06 | 4.94E+06 | 4.94E+06 | 4.94E+06 |
| Binder resin according to the present invention | | | | | | | | | | |
| Coating liquid No. | Coating liquid 1 | Coating liquid 2 | Coating liquid 2 | Coating liquid 2 | Coating liquid 2 | Coating liquid 2 | Coating liquid 3 | Coating liquid 4 | Coating liquid 5 | Coating liquid 6 |
| Kind of fluorine-containing resin | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 |
| m | 8 | 8 | 8 | 8 | 8 | 8 | 8 | 8 | 8 | 8 |
| n | — | — | — | — | — | — | — | — | — | — |
| $CF_2$ amount (mass %) | 26.7 | 26.5 | 26.5 | 26.5 | 26.5 | 26.5 | 25.0 | 55.6 | 24.3 | 42.7 |
| p | — | — | — | — | — | — | — | — | — | — |
| q | — | — | — | — | — | — | — | — | 11 | 2 |
| r | 10 | 10 | 10 | 10 | 10 | 10 | 10 | 1 | — | — |
| Amount of formula (2)-1 (mass %) | 0 | 0 | 0 | 0 | 0 | 0 | 0 | 0 | 0 | C |
| Structural formula for bonding portion | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 |
| Ion exchange group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group |
| Ion opposite in polarity to ion exchange group | TFSI | TFSI | TFSI | TFSI | TFSI | TFSI | TFSI | TFSI | TFSI | TFSI |
| Number of parts of ionic conductive agent (phr) | 1 | 2 | 2 | 2 | 2 | 2 | 8 | 2 | 2 | 2 |
| Characteristic evaluation | | | | | | | | | | |
| Sheet resistance (Ω · cm) (under low-temperature, low-humidity environment) | 9.32.E+06 | 9.05.E+06 | 9.05.E+06 | 9.05.E+06 | 9.05.E+06 | 9.05.E+06 | 7.62.E+06 | 9.63.E+07 | 9.32.E+06 | 5.99.E+07 |
| Sheet resistance (Ω · cm) (under high-temperature, high-humidity environment) | 7.15.E+05 | 6.94.E+05 | 6.94.E+05 | 6.94.E+05 | 6.94.E+05 | 6.94.E+05 | 5.85.E+05 | 6.46.E+06 | 5.38.E+05 | 2.92.E+06 |
| Sheet variation digit | 1.12 | 1.12 | 1.12 | 1.12 | 1.12 | 1.12 | 1.12 | 1.17 | 1.24 | 1.31 |
| Thickness on roller (μm) | 10 | 10 | 1 | 20 | 10 | 10 | 10 | 10 | 10 | 10 |
| Bleeding evaluation | A | A | A | A | A | A | B | A | A | A |

TABLE 8-1-continued

| | Example 1 | Example 2 | Example 3 | Example 4 | Example 5 | Example 6 | Example 7 | Example 8 | Example 9 | Example 10 |
|---|---|---|---|---|---|---|---|---|---|---|
| **Image evaluation** | | | | | | | | | | |
| Pinhole leak test | A | A | A | A | A | A | A | A | A | A |
| Horizontal streak evaluation | A | A | A | A | A | A | A | A | A | A |
| Contamination evaluation | B | B | B | B | B | B | B | A | B | A |
| Discharge current amount (μA) | 43 | 43 | 43 | 43 | 43 | 43 | 46 | 21 | 47 | 27 |

TABLE 8-2

| | Electro-conductive elastic roller No. | | | | | | | | | |
|---|---|---|---|---|---|---|---|---|---|---|
| | 11 | 12 | 13 | 14 | 15 | 16 | 17 | 18 | 19 | 20 |
| Kind of resin of elastic layer | NBR rubber | NBR rubber | NBR rubber | NBR rubber | NBR rubber | NBR rubber | NBR rubber | NBR rubber | NBR rubber | NBR rubber |
| Sheet resistance (Ω · cm) (under low-temperature, low-humidity environment) | 3.50E+05 | 3.50E+05 | 3.50E+05 | 3.50E+05 | 3.50E+05 | 3.50E+05 | 3.50E+05 | 3.50E+05 | 3.50E+05 | 3.50E+05 |
| Sheet resistance (Ω · cm) (under high-temperature, high-humidity environment) | 4.94E+06 | 4.94E+06 | 4.94E+06 | 4.94E+06 | 4.94E+06 | 4.94E+06 | 4.94E+06 | 4.94E+06 | 4.94E+06 | 4.94E+06 |
| **Binder resin according to the present invention** | | | | | | | | | | |
| Coating liquid No. | Coating liquid 7 | Coating liquid 8 | Coating liquid 9 | Coating liquid 10 | Coating liquid 11 | Coating liquid 12 | Coating liquid 13 | Coating liquid 14 | Coating liquid 15 | Coating liquid 16 |
| Kind of fluorine-containing resin | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 |
| m | 8 | 8 | 8 | 8 | 8 | 8 | 8 | 8 | 8 | 8 |
| n | — | — | — | — | — | — | — | — | — | — |
| $CF_2$ amount (mass %) | 47.2 | 57.5 | 35.7 | 44.5 | 51.8 | 39.6 | 34.0 | 43.6 | 7.8 | 23.8 |
| p | 2 | 2 | 2 | 4 | 4 | 4 | 9 | 9 | 4 | 23 |
| q | — | — | — | — | — | — | — | — | — | — |
| r | 10 | 1 | — | 10 | 1 | — | 10 | 1 | — | 10 |
| Amount of formula (2)-1 (mass %) | 10 | 10 | 20 | 20 | 20 | 30 | 30 | 30 | 40 | 40 |
| Structural formula for bonding portion | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 |
| Ion exchange group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group |
| Ion opposite in polarity to ion exchange group | TFSI | TFSI | TFSI | TFSI | TFSI | TFSI | TFSI | TFSI | TFSI | TFSI |
| Number of parts of ionic conductive agent (phr) | 2 | 2 | 2 | 2 | 2 | 2 | 2 | 2 | 2 | 2 |
| **Characteristic evaluation** | | | | | | | | | | |
| Sheet resistance (Ω · cm) (under low-temperature, low-humidity environment) | 5.87.E+07 | 1.23.E+08 | 5.22.E+07 | 5.73.E+07 | 1.07.E+08 | 9.14.E+07 | 3.02.E+07 | 9.53.E+07 | 9.17.E+05 | 1.25.E+07 |
| Sheet resistance (Ω · cm) (under high-temperature, high-humidity environment) | 3.93.E+06 | 7.12.E+06 | 1.70.E+06 | 3.31.E+06 | 5.21.E+06 | 2.33.E+06 | 1.47.E+06 | 3.11.E+06 | 1.77.E+04 | 5.06.E+05 |
| Sheet variation digit | 1.17 | 1.24 | 1.49 | 1.24 | 1.31 | 1.59 | 1.31 | 1.49 | 1.72 | 1.39 |
| Thickness on roller (μm) | 10 | 10 | 10 | 10 | 10 | 10 | 10 | 10 | 10 | 10 |
| Bleeding evaluation | A | A | A | A | A | A | A | A | A | A |
| **Image evaluation** | | | | | | | | | | |
| Pinhole leak test | A | A | A | A | A | A | A | A | A | A |
| Horizontal streak evaluation | A | A | A | A | A | B | A | A | A | A |
| Contamination evaluation | A | A | A | A | A | A | A | A | C | B |
| Discharge current amount (μA) | 24 | 20 | 32 | 26 | 22 | 29 | 34 | 26 | 98 | 48 |

TABLE 8-3

| | Electro-conductive elastic roller No. | | | | | | | | | |
|---|---|---|---|---|---|---|---|---|---|---|
| | 21 | 22 | 23 | 24 | 25 | 26 | 27 | 28 | 29 | 30 |
| Kind of resin of elastic layer | NBR rubber | NBR rubber | NBR rubber | NBR rubber | NBR rubber | NBR rubber | NBR rubber | NBR rubber | NBR rubber | NBR rubber |
| Sheet resistance (Ω · cm) (under low-temperature, low-humidity environment) | 3.50E+05 | 3.50E+05 | 3.50E+05 | 3.50E+05 | 3.50E+05 | 3.50E+05 | 3.50E+05 | 3.50E+05 | 3.50E+05 | 3.50E+05 |
| Sheet resistance (Ω · cm) (under high-temperature, high-humidity environment) | 4.94E+06 | 4.94E+06 | 4.94E+06 | 4.94E+06 | 4.94E+06 | 4.94E+06 | 4.94E+06 | 4.94E+06 | 4.94E+06 | 4.94E+06 |
| Binder resin according to the present invention | | | | | | | | | | |
| Coating liquid No | Coating liquid 17 | Coating liquid 18 | Coating liquid 19 | Coating liquid 20 | Coating liquid 21 | Coating liquid 22 | Coating liquid 23 | Coating liquid 24 | Coating liquid 25 | Coating liquid 26 |
| Kind of fluorine-containing resin | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 | Formula (1)-1 |
| m | 8 | 8 | 8 | 8 | 8 | 8 | 8 | 2 | 2 | 2 |
| n | — | — | — | — | — | — | — | — | — | — |
| $CF_2$ amount (mass %) | 35.5 | 34.0 | 24.7 | 31.0 | 23.4 | 22.2 | 23.0 | 8.3 | 24.2 | 21.3 |
| p | 23 | 9.23 | 9.23 | 9.23 | 9.23 | 23 | 23 | — | — | 2 |
| q | — | — | — | — | — | — | — | — | — | — |
| r | 1 | — | 10 | 1 | — | 10 | 1 | 10 | 1 | 10 |
| Amount of formula (2)-1 (mass %) | 40 | 50 | 50 | 50 | 65 | 65 | 65 | 0 | 0 | 20 |
| Structural formula for bonding portion | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 | Formula (3)-4 |
| Ion exchange group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group |
| Ion opposite in polarity to ion exchange group | TFSI | TFSI | TFSI | TFSI | TFSI | TFSI | TFSI | TFSI | TFSI | TFSI |
| Number of parts of ionic conductive agent (phr) | 2 | 2 | 2 | 2 | 2 | 2 | 2 | 2 | 2 | 2 |
| Characteristic evaluation | | | | | | | | | | |
| Sheet resistance (Ω · cm) (under low-temperature, low-humidity environment) | 6.59.E+07 | 1.06.E+08 | 1.73.E+07 | 5.82.E+07 | 4.15.E+07 | 1.60.E+07 | 3.30.E+07 | 4.38.E+05 | 9.24.E+06 | 7.40.E+06 |
| Sheet resistance (Ω · cm) (under high-temperature, high-humidity environment) | 1.68.E+06 | 1.47.E+06 | 5.63.E+05 | 1.12.E+06 | 4.78.E+05 | 4.08.E+05 | 4.57.E+05 | 2.14.E+04 | 5.33.E+05 | 3.61.E+05 |
| Sheet variation digit | 1.59 | 1.86 | 1.49 | 1.72 | 1.94 | 1.59 | 1.86 | 1.31 | 1.24 | 1.31 |
| Thickness on roller (μm) | 10 | 10 | 10 | 10 | 10 | 10 | 10 | 10 | 10 | 10 |
| Bleeding evaluation | A | A | A | A | A | A | A | A | A | A |
| Image evaluation | | | | | | | | | | |
| Pinhole leak test | A | A | A | A | A | A | A | A | A | A |
| Horizontal streak evaluation | B | C | A | B | C | A | C | A | A | A |
| Contamination evaluation | A | A | B | A | B | B | B | C | B | B |
| Discharge current amount (μA) | 32 | 34 | 47 | 37 | 49 | 52 | 50 | 88 | 47 | 54 |

TABLE 8-4

| | Example 31 | Example 32 | Example 33 | Example 34 | Example 35 | Example 36 | Example 37 | Example 38 | Example 39 | Example 40 |
|---|---|---|---|---|---|---|---|---|---|---|
| Electro-conductive elastic roller No. | | | | | | | | | | |
| Kind of resin of elastic layer | NBR rubber | NBR rubber | NBR rubber | NBR rubber | NBR rubber | NBR rubber | NBR rubber | NBR rubber | NBR rubber | NBR rubber |

TABLE 8-4-continued

| | Example 31 | Example 32 | Example 33 | Example 34 | Example 35 | Example 36 | Example 37 | Example 38 | Example 39 | Example 40 |
|---|---|---|---|---|---|---|---|---|---|---|
| Sheet resistance (Ω · cm) (under low-temperature, low-humidity environment) | 3.50E+05 | 3.50E+05 | 3.50E+05 | 3.50E+05 | 3.50E+05 | 3.50E+05 | 3.50E+05 | 3.50E+05 | 3.50E+05 | 3.50E+05 |
| Sheet resistance (Ω · cm) (under high-temperature, high-humidity environment) | 4.94E+06 | 4.94E+06 | 4.94E+06 | 4.94E+06 | 4.94E+06 | 4.94E+06 | 4.94E+06 | 4.94E+06 | 4.94E+06 | 4.94E+06 |
| Binder resin according to the present invention | | | | | | | | | | |
| Coating liquid No. | Coating liquid 27 | Coating liquid 28 | Coating liquid 29 | Coating liquid 30 | Coating liquid 31 | Coating liquid 32 | Coating liquid 33 | Coating liquid 34 | Coating liquid 35 | Coating liquid 36 |
| Kind of fluorine-containing resin | Formula (1)-1 | Formula (1)-1 | Formula (1)-1 | Formula (1)-2 | Formula (1)-2 | Formula (1)-2 | Formula (1)-2 | Formula (1)-2 | Formula (1)-2 | Formula (1)-2 |
| m | 2 | 2 | 2 | — | — | — | — | — | — | — |
| n | — | — | — | 11 | 11 | 11 | 11 | 11 | 11 | 11 |
| $CF_2$ amount (mass %) | 25.8 | 19.6 | 20.9 | 53.4 | 86.8 | 48.0 | 55.4 | 71.6 | 80.4 | 83.7 |
| p | 2 | 4 | 4 | — | — | 23 | 23 | — | — | — |
| q | — | — | — | — | — | — | — | — | — | 4 |
| r | 1 | 10 | 1 | 10 | 1 | 10 | 1 | 12 | 9 | — |
| Amount of formula (2)-1 (mass %) | 20 | 40 | 40 | 0 | 0 | 40 | 40 | 0 | 0 | 0 |
| Structural formula for bonding portion | Formula (3)-4 | Formula (3)-4 | Formula (3)-4 | Formula (3)-4 | Formula (3)-4 | Formula (3)-4 | Formula (3)-4 | Formula (3)-6 | Formula (3)-6 | Formula (3)-6 |
| Ion exchange group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group | Quaternary ammonium group |
| Ion opposite in polarity to ion exchange group | TFSI | TFSI | TFSI | TFSI | TFSI | TFSI | TFSI | TFSI | TFSI | TFSI |
| Number of parts of ionic conductive agent (phr) | 2 | 2 | 2 | 2 | 2 | 2 | 2 | 2 | 2 | 2 |
| Characteristic evaluation | | | | | | | | | | |
| Sheet resistance (Ω · cm) (under low-temperature, low-humidity environment) | 1.98.E+07 | 8.66.E+06 | 1.77.E+07 | 7.43.E+07 | 4.25.E+08 | 8.53.E+07 | 1.96.E+08 | 1.79.E+08 | 2.91.E+08 | 4.50.E+08 |
| Sheet resistance (Ω · cm) (under high-temperature, high-humidity environment) | 6.45.E+05 | 2.82.E+05 | 3.41.E+05 | 5.70.E+06 | 2.45.E+07 | 4.16.E+06 | 6.39.E+06 | 1.38.E+07 | 1.95.E+07 | 2.20.E+07 |
| Sheet variation digit | 1.49 | 1.49 | 1.72 | 1.12 | 1.24 | 1.31 | 1.49 | 1.12 | 1.17 | 1.31 |
| Thickness on roller (μm) | 10 | 10 | 10 | 10 | 10 | 10 | 10 | 10 | 10 | 10 |
| Bleeding evaluation | A | A | A | A | A | A | A | B | B | B |
| Image evaluation | | | | | | | | | | |
| Pinhole leak test | A | A | A | A | A | A | A | A | A | A |
| Horizontal streak evaluation | A | A | A | C | C | C | C | C | C | C |
| Contamination evaluation | B | B | B | A | A | A | A | A | A | A |
| Discharge current amount (μA) | 45 | 59 | 55 | 22 | 13 | 24 | 21 | 16 | 14 | 14 |

TABLE 8-5

| | Example 41 | Example 42 | Example 43 |
|---|---|---|---|
| Electro-conductive elastic roller No. | | | |
| Kind of resin of elastic layer | NBR rubber | NBR rubber | NBR rubber |
| Sheet resistance (Ω · cm) (under low-temperature, low-humidity environment) | 3.50E+05 | 3.50E+05 | 3.50E+05 |

TABLE 8-5-continued

| | Example 41 | Example 42 | Example 43 |
|---|---|---|---|
| Sheet resistance (Ω · cm) (under high-temperature, high-humidity environment) | 4.94E+06 | 4.94E+06 | 4.94E+06 |
| Binder resin according to the present invention | | | |
| Coating liquid No. | Coating liquid 37 | Coating liquid 38 | Coating liquid 39 |
| Kind of fluorine-containing resin | Formula (1)-2 | Formula (1)-2 | Formula (1)-2 |
| m | — | — | — |
| n | 11 | 11 | 11 |
| $CF_2$ amount (mass %) | 77.7 | 75.0 | 54.5 |
| p | 21 | 21 | 21 |
| q | — | — | — |
| r | — | 12 | 9 |
| Amount of formula (2)-1 (mass %) | 40 | 40 | 40 |
| Structural formula for bonding portion | Formula (3)-6 | Formula (3)-6 | Formula (3)-6 |
| Ion exchange group | Quaternary ammonium group | Quaternary ammonium group | Quaternary ammonium group |
| Ion opposite in polarity to ion exchange group | TFSI | TFSI | TFSI |
| Number of parts of ionic conductive agent (phr) | 2 | 2 | 2 |
| Characteristic evaluation | | | |
| Sheet resistance (Ω · cm) (under low-temperature, low-humidity environment) | 4.35.E+08 | 3.25.E+08 | 1.51.E+08 |
| Sheet resistance (Ω · cm) (under high-temperature, high-humidity environment) | 1.76.E+07 | 1.58.E+07 | 6.08.E+06 |
| Sheet variation digit | 1.39 | 1.31 | 1.39 |
| Thickness on roller (μm) | 10 | 10 | 10 |
| Bleeding evaluation | B | B | B |
| Image evaluation | | | |
| Pinhole leak test | A | A | A |
| Horizontal streak evaluation | C | C | C |
| Contamination evaluation | A | A | A |
| Discharge current amount (μA) | 15 | 15 | 21 |

Example 44

A coating liquid 40 was obtained in the same manner as in the coating liquid 34 except that: 0.35 g of the ionic conductive agent h was used; and 8.7 g (8.67 mmol) of the fluorine-containing resin C were used. The amount of ethylene oxide in the solid content of the coating liquid 40 was 0 mass % and the amount of $CF_2$ therein was 53.35 mass %. An electro-conductive roller 44 was produced in the same manner as in Example 1 except that the coating liquid 40 was used as a raw material for the ionic conductive layer, and then the roller was evaluated as a charging roller. Table 12-1 shows the results of the evaluations. It should be noted that MBI in Table 12-1 represents a 1-butyl-3-methylimidazolium ion.

Example 45

0.27 Gram of the ionic conductive agent a, 8.35 g (21.4 mmol) of a perfluorosuberic acid (manufactured by DAIKIN INDUSTRIES, LTD.) (having a mass-average molecular weight of 390) as a raw material for a fluorine-containing resin, and 10.64 g (25.68 mmol) of 1,4-butanediol diglycidyl ether (manufactured by Sigma-Aldrich) (having a mass-average molecular weight of 202) as a raw material for an alkylene oxide-containing resin were dissolved in toluene. 5 Mass % of 1-benzyl-2-methylimidazole (trade name: Curezol 1B2MZ, manufactured by SHIKOKU CHEMICALS CORPORATION) with respect to the total amount of the solid content was added as a curing accelerator to the solution. Further, toluene was added to adjust the concentration of the solid content to 27 mass %. Thus, a coating liquid 41 was obtained. The amount of ethylene oxide in the solid content of the coating liquid 41 was 0 mass % and the amount of $CF_2$ therein was 46.5 mass %.

An electro-conductive roller 45 was produced in the same manner as in Example 1 except that the coating liquid 41 was used in the formation of the ionic conductive layer, and then the roller was evaluated as a charging roller. Table 12-1 shows the results of the evaluations.

Example 46

0.30 Gram of the ionic conductive agent a as an ionic conductive agent having a reactive functional group, 10.64 g (25.68 mmol) of 1,6-bis(2',3'-epoxypropyl)-perfluoro-n-hexane (manufactured by DAIKIN INDUSTRIES, LTD.) (having a mass-average molecular weight of 414) as a raw material for a fluorine-containing resin, 4.37 g (21.4 mmol) of 1,4-butanediol bis(3-aminopropyl)ether (having a mass-average molecular weight of 204) as a raw material for an alkylene oxide-containing resin, and 1-benzyl-2-methylimidazole (trade name: Curezol 1B2MZ, manufactured by SHIKOKU CHEMICALS CORPORATION) as a curing accelerator were dissolved in toluene, and then the solid content of the solution was adjusted to 27 mass % by adding toluene. Thus, a coating liquid 42 was obtained. The amount of ethylene oxide in the solid content of the coating liquid 42 was 0 mass % and the amount of $CF_2$ therein was 51.5 mass %.

An electro-conductive roller 46 was produced in the same manner as in Example 1 except that the coating liquid 42 was used in the formation of the ionic conductive layer, and then the roller was evaluated as a charging roller. Table 12-1 shows the results of the evaluations.

Example 47

0.37 Gram of the ionic conductive agent a as an ionic conductive agent having a reactive functional group, 10.64 g (25.68 mmol) of 1,6-bis(2',3'-epoxypropyl)-perfluoro-n-hexane (manufactured by DAIKIN INDUSTRIES, LTD.) (having a mass-average molecular weight of 414) as a raw material for a fluorine-containing resin, and 7.96 g (21.4 mmol) of a thiol having ethylene oxide (trade name: EGMP-4, manufactured by SC Organic Chemical Co., Ltd.) (having a mass-average molecular weight of 372) as a raw material for an alkylene oxide-containing resin were dissolved in methyl ethyl ketone. 5 Mass % of a curing accelerator 1-benzyl-2-methylimidazole (trade name: Curezol 1B2MZ, manufactured by SHIKOKU CHEMICALS CORPORATION) with respect to the total amount of the solid content was added to the solution. Further, methyl ethyl ketone was added to adjust the concentration of the solid content to 27 mass %. Thus, a coating liquid 43 was obtained. The amount of ethylene oxide in the solid content of the coating liquid 43 was 20 mass % and the amount of $CF_2$ therein was 40.6 mass %. An electro-conductive roller 47 was produced in the same manner as in Example 1 except that the coating liquid 43 was used in the formation of the ionic conductive layer, and then the roller was evaluated as a charging roller. Table 12-1 shows the results of the evaluations.

Example 48

A coating liquid 44 was produced in the same manner as in the coating liquid 2 except that 0.63 g of the ionic conductive agent b was used. The amount of ethylene oxide in the solid content of the coating liquid 44 was 0 mass % and the amount of $CF_2$ therein was 26.5 mass %. An electro-conductive roller 48 was produced in the same manner as in Example 1 except that the coating liquid 44 was used in the formation of the ionic conductive layer, and then the roller was evaluated as a charging roller. Table 12-1 shows the results of the evaluations.

Example 49

A coating liquid 45 was produced in the same manner as in the coating liquid 16 except that 0.70 g of the ionic conductive agent b was used. The amount of ethylene oxide in the solid content of the coating liquid 45 was 40 mass % and the amount of $CF_2$ therein was 23.8 mass %. An electro-conductive roller 49 was produced in the same manner as in Example 1 except that the coating liquid 45 was used as a raw material for the ionic conductive layer, and then the roller was evaluated as a charging roller. Table 12-1 shows the results of the evaluations.

Example 50

A coating liquid 46 was produced in the same manner as in the coating liquid 2 except that 0.63 g of the ionic conductive agent c was used. The amount of ethylene oxide in the solid content of the coating liquid 46 was 0 mass % and the amount of $CF_2$ therein was 26.5 mass %. An electro-conductive roller 50 was produced in the same manner as in Example 1 except that the coating liquid 46 was used in the formation of the ionic conductive layer, and then the roller was evaluated as a charging roller. Table 12-1 shows the results of the evaluations.

Example 51

A coating liquid 47 was produced in the same manner as in the coating liquid 16 except that 0.70 g of the ionic conductive agent c was used. The amount of ethylene oxide in the solid content of the coating liquid 47 was 40 mass % and the amount of $CF_2$ therein was 23.8 mass %. An electro-conductive roller 51 was produced in the same manner as in Example 1 except that the coating liquid 47 was used in the formation of the ionic conductive layer, and then the roller was evaluated as a charging roller. Table 12-2 shows the results of the evaluations.

Example 52

A coating liquid 48 was produced in the same manner as in the coating liquid 2 except that 0.63 g of the ionic conductive agent d was used. The amount of ethylene oxide in the solid content of the coating liquid 48 was 0 mass % and the amount of $CF_2$ therein was 26.5 mass %. An electro-conductive roller 52 was produced in the same manner as in Example 1 except that the coating liquid 48 was used in the formation of the ionic conductive layer, and then the roller was evaluated as a charging roller. Table 12-2 shows the results of the evaluations. It should be noted that NFSI in Table 12-2 represents nonafluorobutanesulfonylimide.

Example 53

A coating liquid 49 was produced in the same manner as in the coating liquid 16 except that 0.70 g of the ionic conductive agent d was used. The amount of ethylene oxide in the solid content of the coating liquid 49 was 40 mass % and the amount of $CF_2$ therein was 23.8 mass %. An electro-conductive roller 53 was produced in the same manner as in Example 1 except that the coating liquid 49 was used in the formation of the ionic conductive layer, and then the roller was evaluated as a charging roller. Table 12-2 shows the results of the evaluations.

Example 54

A coating liquid 50 was produced in the same manner as in the coating liquid 2 except that 0.63 g of the ionic conductive agent f was used. The amount of ethylene oxide in the solid content of the coating liquid 50 was 0 mass % and the amount of $CF_2$ therein was 26.5 mass %. An electro-conductive roller 54 was produced in the same manner as in Example 1 except that the coating liquid 50 was used in the formation of the ionic conductive layer, and then the roller was evaluated as a charging roller. Table 12-2 shows the results of the evaluations.

Example 55

A coating liquid 51 was produced in the same manner as in the coating liquid 16 except that 0.70 g of the ionic conductive agent f was used. The amount of ethylene oxide in the solid content of the coating liquid 51 was 40 mass % and the amount of $CF_2$ therein was 23.8 mass %. An electro-conductive roller 55 was produced in the same manner as in Example 1 except that the coating liquid 51 was used in the formation of the ionic conductive layer, and then the roller was evaluated as a charging roller. Table 12-2 shows the results of the evaluations.

Example 56

A coating liquid 52 was produced in the same manner as in the coating liquid 2 except that 0.63 g of the ionic conductive agent g was used. The amount of ethylene oxide in the solid content of the coating liquid 52 was 0 mass % and the amount of $CF_2$ therein was 26.5 mass %. An electro-conductive roller 56 was produced in the same manner as in Example 1 except that the coating liquid 52 was used in the formation of the ionic conductive layer, and then the roller was evaluated as a charging roller. Table 12-2 shows the results of the evaluations.

Example 57

A coating liquid 53 was produced in the same manner as in the coating liquid 16 except that 0.70 g of the ionic conductive agent g was used. The amount of ethylene oxide in the solid content of the coating liquid 53 was 40 mass % and the amount of $CF_2$ therein was 23.8 mass %. An electro-conductive roller 57 was produced in the same manner as in Example 1 except that the coating liquid 53 was used in the formation of the ionic conductive layer, and then the roller was evaluated as a charging roller. Table 12-2 shows the results of the evaluations.

Example 58

1.11 Grams of the ionic conductive agent e, 48.15 g (48.2 mmol) of C in Table 5-1 (having a mass-average molecular weight of 1,000) as a raw material for a fluorine-containing resin, 2.9 g (21.4 mmol) of polyoxypropylene polyglyceryl ether (trade name: SC-P750, manufactured by SAKAMOTO YAKUHIN KOGYO CO. LTD.) (having a mass-average molecular weight of 750) as a raw material for an alkylene oxide-containing resin, and 4.7 g (21.4 mmol) of pyromellitic dianhydride (having a mass-average molecular weight of 218.12) as a curing agent were dissolved in methyl ethyl ketone, and then the solid content of the solution was adjusted to 27 mass %. Thus, a coating liquid 54 was obtained. The amount of ethylene oxide in the solid content of the coating liquid 54 was 20 mass % and the amount of $CF_2$ therein was 46.6 mass %.

An electro-conductive roller 58 of this example was produced in the same manner as in Example 1 except that the coating liquid 54 was used in the formation of the ionic conductive layer, and then the roller was evaluated as a charging roller. Table 12-2 shows the results of the evaluations.

Example 59

This example relates to an electro-conductive member illustrated in FIG. 1C in which an elastic layer, an intermediate layer (electro-conductive layer of the present invention), and a surface layer (protective layer) are provided in the stated order on the outer periphery of a mandrel. The protective layer was produced as described below on the outer peripheral surface of an electro-conductive roller produced in the same manner as in Example 2.

Methyl isobutyl ketone was added to a caprolactone-modified acrylic polyol solution and then the solid content was adjusted to 18 mass %. A mixed solution was prepared by using 555.6 parts by mass (100 parts by mass of solid content) of this solution and materials shown in Table 9 below. At this time, the mixture of the block HDI and the block IPDI was added so that a ratio "NCO/OH" was 1.0.

TABLE 9

| Material | Usage (part(s) by mass) |
|---|---|
| Caprolactone-modified acrylic polyol solution | 100 (solid content) |
| Carbon black (HAF) | 16 |
| Needle-like rutile-type titanium oxide fine particles (surface-treated with hexamethylenedisilazane and dimethyl silicone, average particle diameter: 0.015 μm, longitudinal:horizontal = 3:1) | 35 |
| Modified dimethyl silicone oil | 0.1 |
| Mixture containing the respective butanone oxime block bodies of hexamethylene diisocyanate (HDI) and isophorone diisocyanate (IPDI) at 7:3 | 80.14 |

Next, 210 g of the mixed solution and 200 g of glass beads having an average particle diameter of 0.8 mm as media were mixed in a 450-mL glass bottle, and were then dispersed with a paint shaker dispersing machine for 24 hours. After the dispersion, 5.44 parts by mass (amount corresponding to 20 parts by mass with respect to 100 parts by mass of the acrylic polyol) of crosslinking type acrylic particles "MR50G" (trade name, manufactured by Soken Chemical & Engineering Co., Ltd.) as resin particles were added to the resultant, followed by dispersion for an additional thirty minutes. Thus, a paint for forming the surface layer was obtained.

The electro-conductive roller produced in the same manner as in Example 2 was subjected to dipping application with the paint by the same dipping method as that of Example 1. The resultant coated product was air-dried at normal temperature for 30 minutes or more. Next, the product was dried with a hot air-circulating dryer set to 90° C. for 1 hour. Further, the product was dried with a hot air-circulating dryer set to 160° C. for 1 hour. Thus, the surface layer was formed on the electro-conductive layer. An electro-conductive roller 59 was produced as described above and then evaluated as a charging roller. Table 12-2 shows the results of the evaluations.

Example 60

A kneading rubber composition was prepared while the kinds and usages of the raw materials for the kneading rubber composition were changed to those shown in Table 10 below. 177 Parts by mass of the kneading rubber composition and respective materials whose kinds were shown in Table 11 below were mixed with an open roll. In addition, the coating liquid 2 was used as a raw material for the electro-conductive layer. An electro-conductive roller 60 was produced under the same conditions as those of Example 1 except the foregoing, and was then evaluated as a charging roller. Table 12-2 shows the results of the evaluations.

TABLE 10

| Material | Blending amount (part(s) by mass) |
|---|---|
| Hydrin rubber (trade name: Epichlomer CG-102, manufactured by DAISO CO., LTD.) | 100 |
| Zinc stearate | 1 |
| Zinc oxide | 5 |
| Heavy calcium carbonate | 60 |

TABLE 10-continued

| Material | Blending amount (part(s) by mass) |
|---|---|
| MT-Carbon Black (trade name: Thermax Floform N990, manufactured by Cancarb) | 5 |
| Sebacic acid polyester | 5 |
| Quaternary ammonium salt (trade name: Adekasizer LV70, manufactured by ADEKA CORPORATION) | 2 |

TABLE 11

| Material | Blending amount (part(s) by weight) |
|---|---|
| Sulfur | 1 |
| Dibenzothiazyl disulfide (trade name: NOCCELER DM, manufactured by OUCHI SHINKO CHEMICAL INDUSTRIAL CO., LTD.) | 1 |
| Tetramethylthiuram monosulfide (trade name: NOCCELER TS, manufactured by OUCHI SHINKO CHEMICAL INDUSTRIAL CO., LTD.) | 1 |

Example 61 and Example 62

Electro-conductive rollers 61 and 62 were each produced in the same manner as in Example 60 except that the thickness of the ionic conductive layer was changed by using the coating liquid 2, and then the rollers were evaluated as charging rollers. Table 12-3 shows the results of the evaluations.

Example 63

An electro-conductive roller 63 was produced in the same manner as in Example 60 except that the coating liquid 16 was used as a raw material for the ionic conductive layer, and then the roller was evaluated as a charging roller. Table 12-3 shows the results of the evaluations.

Example 64

An electro-conductive roller 64 was produced in the same manner as in Example 60 except that a hydrin rubber (trade name: Epichlomer ON-105, manufactured by DAISO CO., LTD.) was used instead of the hydrin rubber (trade name: Epichlomer CG-102, manufactured by DAISO CO., LTD.) as a raw material for the kneading rubber composition, and then the roller was evaluated as a charging roller. Table 12-3 shows the results of the evaluations.

Example 65

This example relates to an electro-conductive member illustrated in FIG. 1A in which the electro-conductive layer of the present invention is provided on the outer periphery of a mandrel.

Placed as an electro-conductive mandrel (cored bar) in a die was a product obtained by plating a cored bar made of SUS with nickel and then applying and baking an adhesive to the cored bar.

63.45 Grams of the ionic conductive agent a having a reactive functional group, 98.9 g (214 mmol) of 2,2,3,3,4,4,5,5,6,6,7,7,8,8,9,9-hexadecafluoro-1,10-decanediol (manufactured by Sigma-Aldrich) (having a mass-average molecular weight of 462) as a raw material for a fluorine-containing resin, and 218.3 g (256.8 mmol) of decabutylene glycol diglycidyl ether (having a mass-average molecular weight of 850) as a raw material for an alkylene oxide-containing resin were mixed. 5 Mass % of 1-benzyl-2-methylimidazole (trade name: Curezol 1B2MZ, manufactured by SHIKOKU CHEMICALS CORPORATION) with respect to the total amount of the respective components was added as a curing accelerator to the mixture. Thus, a coating liquid 55 (mixture for die forming) was prepared. The amount of ethylene oxide in the solid content of the coating liquid 55 was 0 mass % and the amount of $CF_2$ therein was 26.7 mass %.

A proper amount of the coating liquid 55 was injected into a cavity formed in the die. Subsequently, the die was heated at 80° C. for 1 hour and at 160° C. for 3 hours to subject the liquid to vulcanization curing. After having been cooled, the resultant was removed from the die. Thus, the cored bar whose surface was coated with the electro-conductive layer was obtained. After that, the end portions of the electro-conductive layer were cut and removed so that the length of the electro-conductive layer became 228 mm. An electro-conductive roller 65 was produced as described above and then evaluated as a charging roller. Table 12-3 shows the results of the evaluations.

Comparative Example 1

0.29 Gram of the ionic conductive agent a as an ionic conductive agent having a reactive functional group, 10.64 g (25.68 mmol) of 1,6-bis(2',3'-epoxypropyl)-perfluoro-n-hexane (manufactured by DAIKIN INDUSTRIES, LTD.) (having a mass-average molecular weight of 414) as a raw material for a fluorine-containing resin, and 3.73 g (21.4 mmol) of 1,10-decanediol (having a mass-average molecular weight of 850) were dissolved in methyl ethyl ketone. 5 Mass % of 1-benzyl-2-methylimidazole (trade name: Curezol 1B2MZ, manufactured by SHIKOKU CHEMICALS CORPORATION) with respect to the total amount of the solid content was added as a curing accelerator to the solution. Further, methyl ethyl ketone was added to the solution to adjust the concentration of the solid content to 27 mass %. Thus, a coating liquid 56 was prepared. The amount of ethylene oxide in the solid content of the coating liquid 56 was 0 mass % and the amount of $CF_2$ therein was 52.6 mass %.

An electro-conductive roller C1 was produced in the same manner as in Example 1 except that the coating liquid 56 was used as a raw material for the ionic conductive layer, and then the roller was evaluated. Table 12-3 shows the results of the evaluations.

Comparative Example 2

0.62 Gram of tetraethylammonium chloride as an ionic conductive agent, 11.87 g (25.68 mmol) of 2,2,3,3,4,4,5,5,6,6,7,7,8,8,9,9-hexadecafluoro-1,10-decanediol (manufactured by Sigma-Aldrich) (having a mass-average molecular weight of 462) as a raw material for a fluorine-containing resin, and 20.54 g (21.4 mmol) of undecapropylene glycol diglycidyl ether (having a mass-average molecular weight of 960) as a raw material for an alkylene oxide-containing resin were dissolved in methyl ethyl ketone. 5 Mass % of 1-benzyl-2-methylimidazole (trade name: Curezol 1B2MZ, manufactured by SHIKOKU CHEMICALS CORPORATION) with respect to the total amount of the solid content was added as a curing accelerator to the solution. Further, methyl ethyl ketone was added to the solution to adjust the concentration of the solid content to 27 mass %. Thus, a coating liquid 57 was prepared. The amount of ethylene oxide in the solid content of the coating liquid 57 was 0 mass % and the amount of $CF_2$ therein was 31.1 mass %.

An electro-conductive roller C2 was produced in the same manner as in Example 1 except that the coating liquid 57 was used as a raw material for the ionic conductive layer, and then the roller was evaluated. Table 12-3 shows the results of the evaluations.

Comparative Example 3

0.39 Gram of the ionic conductive agent a as an ionic conductive agent having a reactive functional group, 9.89 g of a polyvinylidene fluoride (trade name: KUREHA KF POLYMER, manufactured by KUREHA CORPORATION) as a raw material for a fluorine-containing resin, and 3.73 g (21.4 mmol) of nonaethylene glycol diglycidyl ether (having a mass-average molecular weight of 482) were dissolved in dimethylformamide, and then the solid content of the solution was adjusted to 27 mass %. Thus, a coating liquid 58 was prepared. The amount of ethylene oxide in the solid content of the coating liquid 58 was 40 mass %.

An electro-conductive roller C3 was produced in the same manner as in Example 1 except that the coating liquid 58 was used as a raw material for the ionic conductive layer, and then the roller was evaluated as a changing roller. Table 12-3 shows the results of the evaluations.

TABLE 12-1

| | Example 44 | Example 45 | Example 46 | Example 47 | Example 48 | Example 49 | Example 50 |
|---|---|---|---|---|---|---|---|
| Electro-conductive elastic roller | | | | | | | |
| Kind of resin of elastic layer | NBR rubber | NBR rubber | NBR rubber | NBR rubber | NBR rubber | NBR rubber | NBR rubber |
| Sheet resistance (Ω · cm) (under low-temperature, low-humidity environment) | 3.50E+05 | 3.50E+05 | 3.50E+05 | 3.50E+05 | 3.50E+05 | 3.50E+05 | 3.50E+05 |
| Sheet resistance (Ω · cm) (under high-temperature, high-humidity environment) | 4.94E+06 | 4.94E+06 | 4.94E+06 | 4.94E+06 | 4.94E+06 | 4.94E+06 | 4.94E+06 |
| Binder resin according to the present invention | | | | | | | |
| Coating liquid No. | Coating liquid 40 | Coating liquid 41 | Coating liquid 42 | Coating liquid 43 | Coating liquid 44 | Coating liquid 45 | Coating liquid 46 |
| Kind of fluorine-containing resin | Formula (1)-2 | Formula (1)-1 | Formula (1)-1 | Formula (1)-1 | Formula (1)-1 | Formula (1)-1 | Formula (1)-1 |
| m | — | 6 | 6 | 6 | 8 | 8 | 8 |
| n | 11 | — | — | — | — | — | — |
| $CF_2$ amount (mass %) | 53.4 | 46.5 | 50.3 | 40.6 | 26.5 | 23.8 | 26.5 |
| p | — | — | — | 4 | — | 23 | — |
| q | — | — | — | — | — | — | — |
| r | 12 | 1 | 1 | — | 10 | 10 | 10 |
| Amount of formula (2)-1 (mass %) | 0 | 0 | 0 | 20 | 0 | 40 | 0 |
| Structural formula for bonding portion | Formula (3)-6 | Formula (3)-3 | Formula (3)-1 Formula (3)-2 | Formula (3)-5 | Formula (3)-4 | Formula (3)-4 | Formula (3)-4 |
| Ion exchange group | Sulfo group | Quaternary ammonium group | Quaternary ammonium group | Quaternary ammonium group | Quaternary ammonium group | Quaternary ammonium group | Quaternary ammonium group |
| Ion opposite in polarity to ion exchange group | MBI | TFSI | TFSI | TFSI | Perchlorate ion | Perchlorate ion | Chloride ion |
| Number of parts of ionic conductive agent (phr) | 2 | 2 | 2 | 2 | 2 | 2 | 2 |
| Characteristic evaluation | | | | | | | |
| Sheet resistance (Ω · cm) (under low-temperature, low-humidity environment) | 1.17.E+08 | 7.72.E+07 | 8.30.E+07 | 6.22.E+07 | 1.04.E+07 | 1.55.E+07 | 1.04.E+07 |
| Sheet resistance (Ω · cm) (under high-temperature, high-humidity environment) | 5.69.E+06 | 3.77.E+06 | 4.79.E+06 | 2.51.E+06 | 6.94.E+05 | 5.06.E+05 | 6.94.E+05 |
| Sheet variation digit | 1.31 | 1.31 | 1.24 | 1.39 | 1.17 | 1.49 | 1.17 |
| Thickness on roller (μm) | 10 | 10 | 10 | 10 | 10 | 10 | 10 |
| Bleeding evaluation | C | B | B | B | B | B | B |
| Image evaluation | | | | | | | |
| Pinhole leak test | A | A | A | A | A | A | A |
| Horizontal streak evaluation | C | B | B | B | A | A | A |
| Contamination evaluation | A | A | A | A | B | B | B |
| Discharge current amount (μA) | 22 | 25 | 23 | 28 | 43 | 48 | 43 |

TABLE 12-2

| | Example 51 | Example 52 | Example 53 | Example 54 | Example 55 | Example 56 | Example 57 | Example 58 | Example 59 | Example 60 |
|---|---|---|---|---|---|---|---|---|---|---|
| Electro-conductive elastic roller | | | | | | | | | | |
| Kind of resin of elastic layer | NBR rubber | NBR rubber | NBR rubber | NBR rubber | NBR rubber | NBR rubber | NBR rubber | NBR rubber | NBR rubber | NBR rubber |
| Sheet resistance (Ω · cm) (under low-temperature, low-humidity environment) | 3.50E+05 | 3.50E+05 | 3.50E+05 | 3.50E+05 | 3.50E+05 | 3.50E+05 | 3.50E+05 | 3.50E+05 | 3.50E+05 | 3.03E+07 |
| Sheet resistance (Ω · cm) (under high-temperature, high-humidity environment) | 4.94E+06 | 4.94E+06 | 4.94E+06 | 4.94E+06 | 4.94E+06 | 4.94E+06 | 4.94E+06 | 4.94E+06 | 4.94E+06 | 8.47E+05 |
| Binder resin according to the present invention | | | | | | | | | | |
| Coating liquid No. | Coating liquid 47 | Coating liquid 48 | Coating liquid 49 | Coating liquid 5C | Coating liquid 51 | Coating liquid 52 | Coating liquid 53 | Coating liquid 54 | Coating liquid 2 | Coating liquid 2 |
| Kind of fluorine-containing resin | Formula (1)-1 | Formula (1)-1 | Formula (1)-1 | Formula (1)-2 | Formula (1)-1 | Formula (1)-1 | Formula (1)-1 | Formula (1)-1 | Formula (1)-1 | Formula (1)-1 |
| m | 8 | 8 | 8 | 11 | 8 | 8 | 8 | 8 | 8 | 8 |
| n | — | — | — | — | — | — | — | — | — | — |
| $CF_2$ amount (mass %) | 23.8 | 26.5 | 23.8 | 26.5 | 23.8 | 26.5 | 23.8 | 54.4 | 26.5 | 26.5 |
| p | 23 | — | 23 | — | 23 | — | 23 | — | — | — |
| q | — | — | — | — | — | — | — | 9 | — | — |
| r | 10 | 10 | 10 | 10 | 10 | 10 | 10 | — | 10 | 10 |
| Amount of formula (2)-1 (mass %) | 40 | 0 | 40 | 0 | 40 | 0 | 40 | 0 | 0 | 0 |
| Structural formula for bonding portion | Formula (3)-4 | Formula (3)-4 | Formula (3)-4 | Formula (3)-4 | Formula (3)-4 | Formula (3)-4 | Formula (3)-4 | — | Formula (3)-4 | Formula (3)-4 |
| Ion exchange group | Quaternary ammonium group | Quaternary ammonium group | Quaternary ammonium group | Sulfo group | Sulfo group | Sulfo group | Quater-nary ammo-nium group | Quaternary ammonium group | Quaternary ammonium group | Quaternary ammonium group |
| Ion opposite in polarity to ion exchange group | Chloride ion | NFSI | NFSI | Sodium ion | Sodium ion | MBI | TFSI | TFSI | TFSI | TFSI |
| Number of parts of ionic conductive agent (phr) | 2 | 2 | 2 | 2 | 2 | 2 | 2 | 2 | 2 | 2 |
| Characteristic evaluation | | | | | | | | | | |
| Sheet resistance (Ω · cm) (under low-temperature, low-humidity environment) | 1.55.E+07 | 1.04.E+07 | 1.55.E+07 | 1.20.E+07 | 1.98.E+07 | 1.20.E+07 | 1.98.E+07 | 1.85.E+08 | 9.05.E+06 | 9.05.E+06 |
| Sheet resistance (Ω · cm) (under high-temperature, high-humidity environment) | 5.06.E+05 | 6.94.E+05 | 5.06.E+05 | 6.94.E+05 | 5.06.E+05 | 6.94.E+05 | 5.06.E+05 | 6.05.E+06 | 6.94.E+05 | 6.94.E+05 |
| Sheet variation digit | 1.49 | 1.17 | 1.49 | 1.24 | 1.59 | 1.24 | 1.59 | 1.49 | 1.12 | 1.12 |
| Thickness on roller (μm) | 10 | 10 | 10 | 10 | 10 | 10 | 10 | 10 | 10 | 10 |
| Bleeding evaluation | B | B | B | C | C | C | C | A | A | A |

TABLE 12-2-continued

| | Example 51 | Example 52 | Example 53 | Example 54 | Example 55 | Example 56 | Example 57 | Example 58 | Example 59 | Example 60 |
|---|---|---|---|---|---|---|---|---|---|---|
| Image evaluation | | | | | | | | | | |
| Pinhole leak test | A | A | A | A | A | A | A | A | A | A |
| Horizontal streak evaluation | A | A | A | A | A | A | A | B | A | A |
| Contamination evaluation | B | B | B | B | B | B | B | C | B | B |
| Discharge current amount (μA) | 48 | 43 | 48 | 43 | 48 | 43 | 48 | 21 | 43 | 43 |

TABLE 12-3

| | Example 61 | Example 62 | Example 63 | Example 64 | Example 65 | Comparative Example 1 | Comparative Example 2 | Comparative Example 3 |
|---|---|---|---|---|---|---|---|---|
| Electro-conductive elastic roller | | | | | | | | |
| Kind of resin of elastic layer | Epichloro-hydrin rubber | Epichloro-hydrin rubber | Epichlorohydrin rubber | Epichlorohydrin rubber | — | NBR rubber | NBR rubber | NBR rubber |
| Sheet resistance (Ω · cm) (under low-temperature, low-humidity environment) | 3.03E+07 | 3.03E+07 | 3.03E+07 | 6.60E+06 | — | 3.50E+05 | 3.50E+05 | 3.03E+05 |
| Sheet resistance (Ω · cm) (under high-temperature, high-humidity environment) | 8.47E+05 | 8.47E+05 | 8.47E+05 | 1.85E+05 | — | 4.94E+06 | 4.94E+06 | 4.94E+06 |
| Binder resin according to the present invention | | | | | | | | |
| Coating liquid No. | Coating liquid 2 | Coating liquid 2 | Coating liquid 16 | Coating liquid 2 | Coating liquid 55 | Coating liquid 56 | Coating liquid 57 | Coating liquid 58 |
| Kind of fluorine-containing resin | Formula (1)-1 | Formula (1)-1 | Formula (1)-1 | Formula (1)-1 | Formula (1)-1 | Formula (1)-1 | Formula (1)-1 | — |
| m | 8 | 8 | 8 | 8 | 8 | 8 | 8 | — |
| n | — | — | — | — | — | — | — | — |
| $CF_2$ amount (mass %) | 26.5 | 26.5 | 23.8 | 26.5 | 13.5 | 52.6 | 31.1 | 14 |
| p | — | — | 23 | — | — | — | — | |
| q | — | — | — | — | — | — | 11 | — |
| r | 10 | 10 | 10 | 10 | 10 | — | — | — |
| Amount of formula (2)-1 (mass %) | 0 | 0 | 40 | 0 | 0 | 0 | 0 | 40 |
| Structural formula for bonding portion | Formula (3)-4 | Formula (3)-4 | Formula (3)-4 | Formula (3)-4 | Formula (3)-4 | Formula (3)-4 | Formula (3)-4 | — |
| Ion exchange group | Quaternary ammonium group | Quaternary ammonium group | Quaternary ammonium group | Quaternary ammonium group | Quaternary ammonium group | Quaternary ammonium group | — | Quaternary ammonium group |
| Ion opposite in polarity to ion exchange group | TFSI | TFSI | TFSI | TFSI | TFSI | TFSI | — | TFSI |
| Number of parts of ionic conductive agent (phr) | 2 | 2 | 2 | 2 | 20 | 2 | 2 | 2 |
| Characteristic evaluation | | | | | | | | |
| Sheet resistance (Ω · cm) (under low-temperature, low-humidity environment) | 9.05.E+06 | 9.05.E+06 | 1.25.E+07 | 9.05.E+06 | 1.60.E+06 | 6.36.E+010 | 8.79.E+06 | 9.10.E+01 |
| Sheet resistance (Ω · cm) (under high-temperature, high-humidity environment) | 6.94.E+05 | 6.94.E+05 | 5.06.E+05 | 6.94.E+05 | 9.21.E+04 | 2.07.E+09 | 7.24.E+04 | 7.50.E−01 |
| Sheet variation digit | 1.12 | 1.12 | 1.39 | 1.12 | 1.24 | 1.49 | 2.08 | 2.08 |
| Thickness on roller (μm) | 1 | 20 | 10 | 10 | 3,025 | 10 | 10 | 10 |
| Bleeding evaluation | A | A | A | A | B | — | D | A |

TABLE 12-3-continued

| | Example 61 | Example 62 | Example 63 | Example 64 | Example 65 | Comparative Example 1 | Comparative Example 2 | Comparative Example 3 |
|---|---|---|---|---|---|---|---|---|
| Image evaluation | | | | | | | | |
| Pinhole leak test | A | A | A | A | A | — | B | C |
| Horizontal streak evaluation | A | A | A | A | A | — | D | D |
| Contamination evaluation | B | B | B | B | C | — | C | B |
| Discharge current amount (μA) | 43 | 43 | 48 | 43 | 85 | — | 37 | 156 |

Example 66

<1. Production of Developing Roller>

Used as an electro-conductive mandrel (cored bar) was a product obtained by plating a cored bar made of SUS with nickel and then applying and baking an adhesive to the cored bar. The cored bar was placed in a die, and then respective materials whose kinds and amounts were shown in Table 13 below were mixed in an apparatus. After that, the mixture was injected into a cavity formed in the die preheated to 120° C. to provide such an unvulcanized rubber roller that the outer peripheral portion of the cored bar was coated with a rubber composition. Subsequently, the die was heated at 120° C. to subject the unvulcanized rubber roller to vulcanization curing. The resultant was cooled and then removed from the die. Thus, a "vulcanized rubber roller made of a silicone rubber" having a diameter of 12 mm was obtained. After that, the end portions of the elastic layer were cut and removed so that the length of the elastic layer became 228 mm. Thus, an "elastic roller 66" was obtained.

TABLE 13

| Material | Usage (part(s) by mass) |
|---|---|
| Liquid silicone rubber (trade name: SE6724A/B, manufactured by Dow Corning Toray Co., Ltd.) | 100 |
| Carbon Black | 35 |
| (trade name: TOKABLACK #7360SB, manufactured by TOKAI CARBON CO., LTD.) | 35 |
| Silica powder | 0.2 |
| Platinum catalyst | 0.1 |

The elastic roller was subjected to dipping application with the coating liquid 2 by the same dipping method as that of Example 1. The resultant coated product was air-dried at normal temperature for 30 minutes or more. Next, the product was dried with a hot air-circulating dryer set to 90° C. for 1 hour. Further, the product was dried with a hot air-circulating dryer set to 160° C. for 3 hours, whereby an electro-conductive layer was formed on the elastic layer. Thus, an electro-conductive roller 66 was obtained.

<2. Characteristic Evaluation>

The measurement of the resistivities of the electro-conductive layer and a developing roller was performed, and an evaluation for bleeding was performed by the same methods as the methods for the characteristic evaluations of a charging roller. Table 14 shows the results of the evaluations.

<3. Image Evaluation>

The image evaluations of a developing roller according to the present invention were performed by the following methods. Table 14 shows the results of the evaluations.

(Evaluation 7: Evaluation for Fogging Under Low-Temperature, Low-Humidity Environment)

The electro-conductive roller 66 was mounted as a developing roller on a process cartridge for a color laser printer (trade name: Color LaserJet CP2025dn, manufactured by Hewlett-Packard Japan, Ltd.). A magenta toner mounted on the process cartridge was used as toner without being treated. The process cartridge on which the developing roller had been mounted was left to stand under the L/L environment for 48 hours. After that, the process cartridge was incorporated into the color laser printer that had been left to stand under the same environment as that of the process cartridge. 6,000 Images each having a print percentage of 4% were output under the environment and then a solid white image was output on 1 sheet of glossy paper. The average of the reflection densities of the output solid white image measured at 16 points (respective central points of 16 squares obtained by equally dividing the glossy paper into 4 sections in its longitudinal direction and equally dividing the paper into 4 sections in its horizontal direction) was defined as Ds (%), the average of the reflection densities of the glossy paper before the output of the solid white image measured at the 16 points was defined as Dr (%), and Ds-Dr was defined as a fogging amount. It should be noted that the reflection densities were measured with a reflection densitometer (trade name: White Photometer TC-6DS/A, manufactured by Tokyo Denshoku CO., LTD.). Fogging was evaluated as described below.

A: The fogging amount is less than 0.5%.

B: The fogging amount is 0.5% or more and less than 2%.

C: The fogging amount is 2% or more and less than 5%.

D: The fogging amount is 5% or more.

(Evaluation 8: Leak Test Under High-Temperature, High-Humidity Environment)

A leak test was performed with a color laser printer (trade name: Color LaserJet CP2025dn, manufactured by Hewlett-Packard Japan, Ltd.) and a reconstructed product of a process cartridge for the color laser printer. The developing blade 28 of the process cartridge was replaced with a blade made of SUS304 having a thickness of 100 μm, and a magenta toner mounted on the process cartridge was used as the toner 29 without being treated.

Next, the process cartridge on which the electro-conductive roller 66 had been mounted as a developing roller was left to stand under the H/H environment for 48 hours. After that, the process cartridge was incorporated into the color laser printer that had been left to stand under the same environment as that of the process cartridge. In the environment, a developing blade bias was set to a voltage lower than a developing roller bias by 300 V, and then such an image evaluation as described below was performed.

First, an initial halftone image was output. After that, 20,000 images each having a print percentage of 4% were continuously output, and then a halftone image after the endurance was output. The leak test was performed on each halftone image by the following method. The presence or absence of a horizontal streak on the halftone image was visually judged, and then a difference in density between the horizontal streak portion and a normal portion was measured with a reflection densitometer (trade name: GretagMacbeth RD918, manufactured by GretagMacbeth), followed by the evaluation of a leak by the following criteria.

A: No horizontal streak is observed.

B: An extremely slight horizontal streak is observed but the density difference is less than 0.05.

C: A horizontal streak is observed, and the density difference is 0.05 or more and less than 0.1.

D: A horizontal streak is observed, and the density difference is 0.1 or more.

Examples 67 and 68

Electro-conductive rollers 67 and 68 were each produced in the same manner as in Example 66 except that the thickness of the ionic conductive layer was changed by using the coating liquid 2, and then the rollers were evaluated as developing rollers. Table 14 shows the results of the evaluations.

Example 69

An electro-conductive roller 69 was produced in the same manner as in Example 66 except that the coating liquid 16 was used as a raw material for the ionic conductive layer, and then the roller was evaluated as a developing roller. Table 14 shows the results of the evaluations.

Example 70

An electro-conductive roller 70 was produced in the same manner as in Example 66 except that the usage of the carbon black as a raw material for the unvulcanized rubber roller was changed to 45 parts by mass, and then the roller was evaluated as a developing roller. Table 14 shows the results of the evaluations.

Comparative Example 4

An electro-conductive roller C4 was produced in the same manner as in Example 66 except that the coating liquid 57 was used as a raw material for the ionic conductive layer, and then the roller was evaluated as a developing roller. Table 14 shows the results of the evaluations.

TABLE 14

| | Example 66 | Example 67 | Example 68 | Example 69 | Example 70 | Comparative Example 4 |
|---|---|---|---|---|---|---|
| Electro-conductive elastic roller | | | | | | |
| Kind of resin of elastic layer | Silicone rubber | Silicone rubber | Silicone rubber | Silicone rubber | Silicone rubber | Silicone rubber |
| Sheet resistance (Ω · cm) (under low-temperature, low-humidity environment) | 3.93E+07 | 3.93E+07 | 3.93E+07 | 3.93E+07 | 9.60E+07 | 3.93E+07 |
| Sheet resistance (Ω · cm) (under high-temperature, high-humidity environment) | 6.23E+08 | 6.23E+08 | 6.23E+08 | 6.23E+08 | 1.52E+09 | 6.23E+08 |
| Binder resin according to the present invention | | | | | | |
| Coating liquid No. | Coating liquid 2 | Coating liquid 2 | Coating liquid 2 | Coating liquid 16 | Coating liquid 2 | Coating liquid 57 |
| Kind of fluorine-containing resin | Formula (1)-1 | Formula (1)-1 | Formula (1)-1 | Formula (1)-1 | Formula (1)-1 | Formula (1)-1 |
| m | 8 | 8 | 8 | 8 | 8 | 8 |
| n | — | — | — | — | — | — |
| $CF_2$ amount (mass %) | 26.5 | 26.5 | 26.5 | 23.8 | 26.5 | 31.1 |
| p | — | — | — | 23 | — | — |
| q | — | — | — | — | — | 11 |
| r | 10 | 10 | 10 | 10 | 10 | — |
| Amount of formula (2)-1 (mass %) | 0 | 0 | 0 | 40 | 0 | 0 |
| Structural formula for bonding portion | Formula (3)-4 | Formula (3)-4 | Formula (3)-4 | Formula (3)-4 | Formula (3)-4 | Formula (3)-4 |
| Ion exchange group | Quaternary ammonium group | Quaternary ammonium group | Quaternary ammonium group | Quaternary ammonium group | Quaternary ammonium group | Quaternary ammonium group |
| Ion opposite in polarity to ion exchange group | TFSI | TFSI | TFSI | TFSI | TFSI | TFSI |
| Number of parts of ionic conductive agent (phr) | 2 | 2 | 2 | 2 | 2 | 2 |
| Characteristic evaluation | | | | | | |
| Sheet resistance (Ω · cm) (under low-temperature, low-humidity environment) | 9.05.E+06 | 9.05.E+06 | 9.05.E+06 | 1.25.E+07 | 9.05.E+06 | 8.79.E+06 |
| Sheet resistance (Ω · cm) (under high-temperature, high-humidity environment) | 6.94.E+05 | 6.94.E+05 | 6.94.E+05 | 5.06.E+05 | 6.94.E+05 | 7.24.E+04 |
| Sheet variation digit | 1.12 | 1.12 | 1.12 | 1.39 | 1.12 | 2.08 |
| Thickness on roller (μm) | 10 | 1 | 20 | 10 | 10 | 10 |
| Bleeding evaluation | A | A | A | A | A | D |
| Image evaluation | | | | | | |
| Fogging evaluation | A | A | A | B | A | B |
| Leak test | A | A | A | A | A | B |

Example 71

An electro-conductive roller 71 was produced in exactly the same manner as in Example 66. The electro-conductive roller 71 was incorporated as a primary transfer roller into an electrophotographic laser printer (trade name: HP Color Laserjet Enterprise CP4525dn, manufactured by Hewlett-Packard Company), and then image output was performed.

An endurance test was performed with the electrophotographic apparatus under an environment having a temperature of 23° C. and a relative humidity of 50%. In the endurance test, 40,000 electrophotographic images are output by repeating the following intermittent image-forming operation. Two images are output, the rotation of a photosensitive drum is completely stopped for about 3 seconds after the output, and image output is restarted. An image to be output at this time was such an image that an alphabetical letter “E” having a size of 4 points was printed so as to have a coverage of 1% with respect to the area of A4-size paper.

Next, the electro-conductive roller 71 was incorporated as a primary transfer roller into the process cartridge again and then an image evaluation was performed. The entire image evaluation was performed under the L/L environment, and was performed by outputting a halftone image (image in which horizontal lines each having a width of 1 dot were drawn in a direction perpendicular to the rotation direction of the photosensitive member at an interval of 2 dots). Table 15 shows the result of the evaluation.

TABLE 15

| | Example 71 |
|---|---|
| Electro-conductive elastic roller | |
| Kind of resin of elastic layer | Silicone rubber |
| Sheet resistance (Ω · cm) (under low-temperature, low-humidity environment) | 3.93E+07 |
| Sheet resistance (Ω · cm) (under high-temperature, high-humidity environment) | 6.23E+08 |
| Binder resin according to the present invention | |
| Coating liquid No. | Coating liquid 2 |
| Kind of fluorine-containing resin | Formula(1)-1 |
| m | 8 |
| n | — |
| $CF_2$ amount (mass %) | 26.5 |
| p | — |
| q | — |
| r | 10 |
| Amount of formula (2)-1 (mass %) | 0 |
| Structural formula for bonding portion | Formula (3)-4 |
| Ion exchange group | Quaternary ammonium group |
| Ion opposite in polarity to ion exchange group | TFSI |
| Number of parts of ionic conductive agent (phr) | 2 |
| Characteristic evaluation | |
| Sheet resistance (Ω · cm) (under low-temperature, low-humidity environment) | 9.05.E+06 |
| Sheet resistance (Ω · cm) (under high-temperature, high-humidity environment) | 6.94.E+05 |
| Sheet variation digit | 1.12 |
| Thickness on roller (μm) | 10 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-284453, filed Dec. 26, 2011, which is hereby incorporated by reference herein in its entirety.

What is claimed is:

1. An electro-conductive member for electrophotography, comprising:

an electro-conductive mandrel; and an electro-conductive layer, wherein:

the electro-conductive layer comprises a binder resin having, in a molecule thereof, a sulfo group or a quaternary ammonium group as an ion exchange group, and an ion opposite in polarity to the ion exchange group;

wherein:

the binder resin comprises any structure selected from the group consisting of structures represented by a chemical formula (1)-1 and a chemical formula (1)-2, and any structure selected from the group consisting of structures represented by a chemical formulae (2)-1 to a chemical formula (2)-3; and wherein:

the binder resin has a molecular structure preventing occurrence of a matrix-domain structure based on the binder resin in the electro-conductive layer:

$—(CF_2)_m—$ Formula (1)-1

$—(CF_2—CF_2—O)_n—$ Formula (1)-2

$—(CH_2—CH_2—O)_p—$ Formula (2)-1

$—(CH_2—CHCH_3—O)_q—$ Formula (2)-2

$—(CH_2—CH_2—CH_2—CH_2—O)_r—$ Formula (2)-3 in the formula (1)-1, m represents an integer of 2 or more and 20 or less, in the formula (1)-2, n represents an integer of 5 or more and 50 or less, in the formula (2)-1, p represents an integer of 1 or more and 25 or less, in the formula (2)-2, q represents an integer of 1 or more and 15 or less, and in the formula (2)-3, r represents an integer of 1 or more and 12 or less.

2. The electro-conductive member according to claim 1, wherein:

the binder resin contains a structure obtained by linking any structure selected from the group consisting of the structures represented by the chemical formula (1)-1 and the chemical formula (1)-2, and any structure selected from the group consisting of the structures represented by the chemical formula (2)-1 to the chemical formula (2)-3 with a linking group containing at least one structure selected from the group consisting of structures represented by the following chemical formula (3)-1 to the following chemical formula (3)-6.

Formula (3)-1

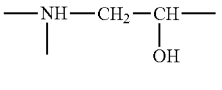

Formula (3)-2

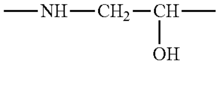

Formula (3)-3

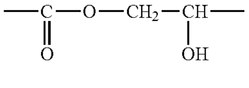

Formula (3)-4

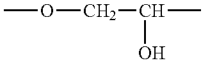

-continued

Formula (3)-5

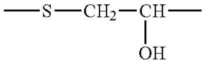

Formula (3)-6

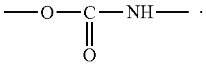

3. The electro-conductive member according to claim 1, wherein: the binder resin contains a structure obtained by linking any structure selected from the group consisting of the structures represented by the chemical formula (1)-1 and the chemical formula (1)-2, and any structure selected from the group consisting of the structures represented by the chemical formula (2)-1 to the chemical formula (2)-3 with a linking group containing at least any structure selected from the group consisting of structures represented by the following chemical formula (4)-1 to the following chemical formula (4)-3:

Formula (4)-1

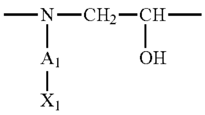

Formula (4)-2

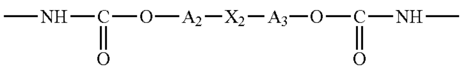

Formula (4)-3

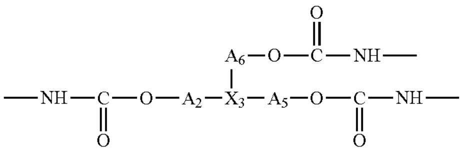

in the formulae (4), $A_1$ to $A_6$ each represent a divalent organic group and $X_1$ to $X_3$ each represent the ion exchange group.

4. The electro-conductive member according to claim 1, wherein: a molecular terminal of the binder resin contains at least one structure selected from the group consisting of structures represented by the following chemical formula (5)-1 to the following chemical formula (5)-5:

Formula (5)-1

$$—NH—A_7—X_4$$

Formula (5)-2

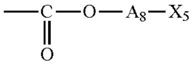

Formula (5)-3

$$—O—A_9—X_6$$

Formula (5)-4

$$—S—A_{10}—X_7$$

Formula (5)-5

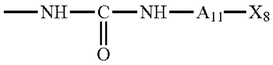

in the formulae (5), $A_7$ to $A_{11}$ each represent a divalent organic group and $X_4$ to $X_8$ each represent the ion exchange group.

5. The electro-conductive member according to claim 1, wherein:

the binder resin has at least the structure represented by the chemical formula (2)-1; and a content of the structure in the binder resin is 30 mass % or less.

6. The electro-conductive member according to claim 1, wherein the binder resin has at least the structure represented by the chemical formula (2)-2 or the chemical formula (2)-3.

7. The electro-conductive member according to claim 1, wherein the ion exchange group comprises a quaternary ammonium group and the ion opposite in polarity comprises a sulfonylimide ion.

8. The electro-conductive member according to claim 2, wherein: the binder resin contains a structure obtained by linking the structure represented by the chemical formula (1)-1 and the structure represented by the chemical formula (2)-3 with a linking group containing any structure selected from the group consisting of the structures represented by the chemical formula (3)-1 to the chemical formula (3)-4.

9. A process cartridge, which is detachably mountable to a main body of an electrophotographic apparatus, comprising the electro-conductive member according to claim 1.

10. An electrophotographic apparatus, comprising the electro-conductive member according to claim 1.

* * * * *